(12) United States Patent
Washio

(10) Patent No.: US 7,586,650 B2
(45) Date of Patent: Sep. 8, 2009

(54) IMAGE PROCESSING APPARATUS AND IMAGE PROCESSING METHOD

(75) Inventor: Koji Washio, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 799 days.

(21) Appl. No.: 10/996,265

(22) Filed: Nov. 23, 2004

(65) Prior Publication Data

US 2005/0265624 A1    Dec. 1, 2005

(30) Foreign Application Priority Data

May 27, 2004    (JP)    ............... 2004-157686

(51) Int. Cl.
*H04N 1/40* (2006.01)

(52) U.S. Cl. .................... 358/3.15; 358/3.06

(58) Field of Classification Search ....... 358/3.14–3.15, 358/3.06, 3.21–3.22, 3.27, 1.9, 2.1; 382/237
See application file for complete search history.

(56) References Cited

U.S. PATENT DOCUMENTS

| | | | | |
|---|---|---|---|---|
| 4,893,188 | A | * | 1/1990 | Murakami et al. ........... 358/2.1 |
| 5,029,108 | A | * | 7/1991 | Lung ........................... 358/1.9 |
| 5,200,831 | A | * | 4/1993 | Tai ............................. 358/3.14 |
| 5,341,224 | A | * | 8/1994 | Eschbach ................... 358/3.27 |
| 6,301,395 | B1 | | 10/2001 | Nishigaki et al. |
| 6,775,032 | B2 | * | 8/2004 | Jacobs ....................... 358/3.14 |
| 2004/0190019 | A1 | * | 9/2004 | Li et al. ...................... 358/1.9 |

FOREIGN PATENT DOCUMENTS

| | | |
|---|---|---|
| JP | 07-334672 | 12/1995 |
| JP | 09-018710 | 1/1997 |
| JP | 09-282471 | 10/1997 |
| JP | 10-173929 A | 6/1998 |
| JP | 2000-134468 A | 5/2000 |
| JP | 2001-239706 A | 9/2001 |
| JP | 2003-153005 A | 5/2003 |

OTHER PUBLICATIONS

Japanese Office Action (and English translation thereof) dated May 13, 2008, issued in a counterpart Japanese Application.

* cited by examiner

*Primary Examiner*—Thomas D Lee
*Assistant Examiner*—Stephen M Brinich
(74) *Attorney, Agent, or Firm*—Frishauf, Holtz, Goodman & Chick, P.C.

(57) ABSTRACT

An image processing apparatus provided with: an edge correction unit for, based on a level of a pixel value of an edge area of an image, correcting the pixel value of the edge area of the image; and a halftone processing unit for carrying out a first halftone processing on the edge area of which the pixel value has been corrected and a second halftone processing on an area of the image that is different from the edge area, the second halftone processing being different from the first halftone processing.

47 Claims, 13 Drawing Sheets

FIG. 3
| I20 | I21 | I22 | I23 | I24 |
|---|---|---|---|---|
| I15 | I16 | I17 | I18 | I19 |
| I10 | I11 | I12 | I13 | I14 |
| I5 | I6 | I7 | I8 | I9 |
| I0 | I1 | I2 | I3 | I4 |
FIG. 4
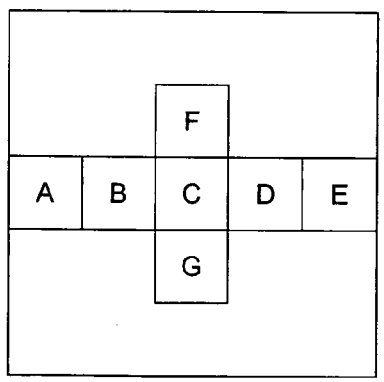
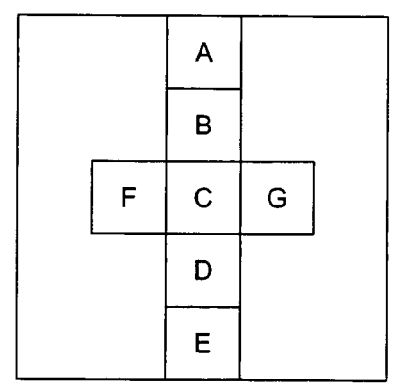
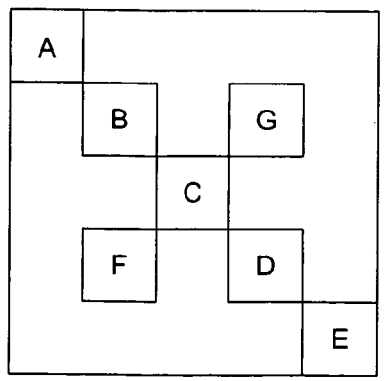
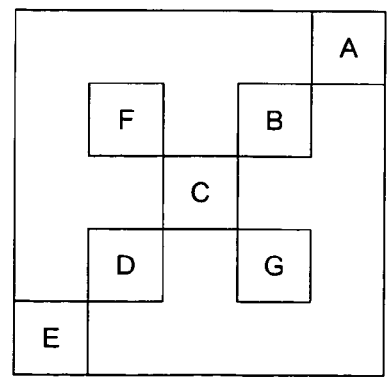

OVER PRINT

KNOCKOUT (CHARACTER > BACKGROUND)

KNOCKOUT (CHARACTER < BACKGROUND)

ORIGINAL IMAGE

: SCREEN

: CONTONE

FIG. 15 (a)

lazy

FIG. 15 (b)

lazy

IMAGE PROCESSING APPARATUS AND IMAGE PROCESSING METHOD

CROSS REFERENCE TO RELATED APPLICATION

The present application is based on Japanese Patent Application No. 2004-157686 filed with Japan Patent Office on May 27, 2004.

BACKGROUND OF THE INVENTION

1. Field of the Invention

The present invention relates to an image processing apparatus and an image processing method that generate output image data by carrying out image processing on input image data such as the processing of enhancing or suppressing the edge by adjusting the output levels of the pixel values in the outline region of characters or line drawings, etc., and/or halftone processing in order to reproduce a halftone.

2. Description of Related Art

At the time of printing out halftone characters or graphics in a printer, etc., it is common to carry out screen processing when reproduction of halftone is given priority. However, when halftone text characters are subjected to screen processing using a large screen, there was the problem that the apparent resolution gets reduced and the outline regions of the text characters become indistinct. Regarding this problem, a method has been disclosed (for example, see Japanese Unexamined Laid-Open Patent Publication No. Hei 9-282471) that judges the feature of each pixel (the type such as character, graphic, etc.) from the information described in the page description language (hereinafter referred to as PDL) and carries out image processing according to that feature. According to this method, for example, the text signal indicating that the pixel belongs to a text character is generated for pixels in the image area of text where priority is usually given to the resolution, and during image processing, a high resolution screen such as a line screen of 400 lines, for instance, is used for the image area for which this text signal has been set, while a low resolution screen such as a line screen of 200 lines, for instance, is used for other areas, thus avoiding the degradation in the resolution of the text part by using screens of different resolutions.

However, in the above method, a blank part is generated near the border where the screen is changed, and this appeared like an outline thereby causing degradation of the image quality. Further, while resolution is given importance than the tone reproduction characteristics in the case of text characters, etc., there are cases when the tone reproduction characteristics need to be given priority, such as when the character size is large, and in such cases, it is likely that the required tone reproduction characteristics cannot be obtained even when a high resolution screen such as a 400-line single line screen is used.

Compared to this, in Japanese Unexamined Laid-Open Patent Publications No. Hei 9-18710 and No. 2001-239706, for instance, a method has been proposed in which the type of image data specified by PDL is recognized and the image data is separated into the outline information indicating text characters, line drawings, and outline parts, and the halftone information indicating halftone areas, and different type of processing is made separately for these two types of areas, by carrying out high resolution bit map processing for the outline information and screen processing for the halftone information. Because of this, it becomes possible to reproduce halftone text characters with enhanced outline sections.

However, since in the above method it is necessary to carry out conversion of resolution two times for at least one of the outline information and the halftone information, there is the problem that the configuration of the apparatus becomes complex. In addition, when several types of PDL are present, since means for separating the outline information will be necessary for each of the PDL languages at the time of separating the outline information, the configuration of the apparatus naturally becomes complex.

Furthermore, depending on the output characteristics on the printer side, there are cases where the widths of the characters or thin lines is reproduced thicker than the correct line widths. In this case, it is possible to suppress the outline portion and make the line of text characters thinner by carrying out the processing of reducing the output level of the outline part of the text characters. For example, a method has been proposed in Japanese Unexamined Laid-Open Patent Publication No. Hei 7-334672 in which the curved line parts with step changes and the straight line parts without step changes are identified by pattern matching, and smoothing processing is made for the curved line parts having step changes while line width adjustment is made for the straight line parts without step changes.

Here, since the output level of the outline parts of the text characters will have to be reduced at the time of carrying out conversion to thin lines in the case of text characters that are expressed in full density over the entire area (the so called 'solid characters' or 'solid letter'), when thin line parts are contained in the text characters, the densities of those fine line parts will be reduced excessively, thereby causing the problem of these lines to appear as if they are broken. In order to solve this problem, in the method described in the JP672 Patent Publication, since it is possible to specify the line width by pattern matching, it is possible to take the countermeasure of excluding the line parts with thin line widths from processing of conversion to thin lines, thereby making it possible to prevent the loss of thin line parts caused by conversion to thin lines. However, the method described in the above mentioned '672 patent Publication can only be applied to the case where the input image has binary values, and it is not possible to take the countermeasures of enhancing the outline or converting to thin lines for halftone text characters or line drawings.

SUMMARY OF THE INVENTION

The present invention is created by considering the above-mentioned situations, and object of the invention is to provide a novel image processing method and apparatus that can reproduce character images and line drawings with keeping resolution and halftone characteristics. Another object of the invention is to provide a novel processing method and apparatus that, when reproducing character images and line drawings, can prevent a line width from becoming large, and can prevent thin lines from broken or vanishing.

(1) To achieve at least one of the above mentioned objects, an image processing apparatus reflecting one aspect of the present invention includes: an edge correction unit for, based on a level of a pixel value of an edge area of an image, correcting the pixel value of the edge area of the image; and a halftone processing unit for carrying out a first halftone processing on the edge area of which the pixel value has been corrected and a second halftone processing on an area of the image that is different from the edge area. Here, the second halftone processing is different from the first halftone processing.

(2) Preferably, the image processing apparatus of (1) further includes an extracting unit for extracting the edge area of the image.

(3) Preferably, in the image processing apparatus of (2), the extracting unit extracts the edge area based on image data.

(4) The image processing apparatus of (3) preferably further includes an image input unit for inputting image data.

(5) In the image processing apparatus of (4), the extracting unit preferably extracts the edge area based on the image data inputted from the image input unit.

(6) The image processing apparatus of (1) preferably further comprises a thin line area detecting unit for detecting a thin line area of the image.

(7) In the image processing apparatus of (6), the edge correction units preferably corrects a part of the edge area that is not determined as the thin line area.

(8) In the image processing apparatus of (6), the thin line area detecting unit preferably uses a mask of n columns and n rows to detect the thin line area.

(9) In the image processing apparatus of (8), the thin line area detecting unit preferably determines that the image includes a thin line area if an area that corresponds to a mask has edges on both sides of a target pixel in a first direction and has an image continuity in a second direction orthogonal to the first direction.

(10) In the image processing apparatus of (9), the edge correction unit preferably determines that the image includes the thin line area further based on the number of conjunction between the target pixel and surrounding pixels.

(11) In the image processing apparatus of (1), the edge correction unit preferably carries out one of an edge enhancement and edge suppression on the edge area by correcting the pixel value of the edge area.

(12) In the image processing apparatus of (1), the second halftone processing is preferably a first screen processing, and the first halftone processing is one of a contone processing and a second screen processing. The second screen processing uses a screen of which the number of screen is different from that used by the first screen processing.

(14) According to an image processing apparatus reflecting another aspect of the present invention, the image processing apparatus includes: a first edge correction unit for, based on a level of a pixel value of an edge area of an image, correcting the pixel value of the edge area of the image in accordance with a first correction processing; a second edge correction unit for, based on the level of the pixel value of the edge area of the image, correcting the pixel value of the edge area of the image in accordance with a second correction processing; a halftone processing unit for carrying out a first halftone processing on the edge area of which the pixel value has been corrected by the first edge correction unit and a second halftone processing on the edge area of which the pixel value has been corrected by the second edge correction unit; and a select unit for selecting one of the pixel value obtained by the first halftone processing and the pixel value obtained by the second halftone processing.

(15) In the image processing apparatus of (14), the first edge correction unit preferably carries out one of an edge enhancement and an edge suppression.

(16) In the image processing apparatus of (14), the halftone processing preferably includes a contone processing and the second halftone processing preferably includes a screen processing.

(17) In the image processing apparatus of (16), wherein the select unit preferably selects a higher one of the pixel value obtained by the first halftone processing and the pixel value obtained by the second halftone processing.

(18) In the image processing apparatus of (16), each of the first halftone processing and the second halftone processing preferably further includes a gamma correction processing.

(19) In the image processing apparatus of (18), the halftone processing unit preferably carries out the contone processing on the edge area to which the gamma correction processing has been applied, and carries out the screen processing on the edge area to which the gamma correction processing has been applied.

(20) The image processing apparatus of (14) preferably further includes an extracting unit for extracting the edge area of the image.

(21) Preferably, the image processing apparatus of (20) further includes an image input unit for inputting image data.

(22) In the image processing apparatus of (21), the extracting unit preferably extracts the edge area based on the image data inputted from the image input unit.

(23) Preferably, the image processing apparatus of (14) further includes a thin line area detecting unit for detecting a thin line area of the image.

(24) In the image processing apparatus of (23), the edge correction units preferably corrects a part of the edge area that is not determined as the thin line area.

(25) In the image processing apparatus of (23), the thin line area detecting unit preferably uses a mask of n columns and n rows to detect the thin line area.

(26) In the image processing apparatus of (25), the thin line area detecting unit preferably determines that the image includes a thin line area if an area that corresponds to a mask has edges on both sides of a target pixel in a first direction and has an image continuity in a second direction orthogonal to the first direction.

(27) In the image processing apparatus of (26), the edge correction unit preferably determines that the image includes the thin line area further based on the number of conjunction between the target pixel and surrounding pixels.

(28) In the image processing apparatus of (14), wherein the edge correction unit preferably carries out one of an edge enhancement and edge suppression on the edge area by correcting the pixel value of the edge area.

BRIEF DESCRIPTION OF THE DRAWINGS

These and other objects, advantages and features of the invention will become apparent from the following description thereof taken in conjunction with the accompanying drawings in which:

FIG. 3 is a diagram showing the image area of 5 pixels×5 pixels with the target pixel C at the center;

FIG. 4 is a diagram showing the thin line detection operators op2 to op5;

FIG. 15(a) is a diagram showing a character string reproduced by carrying out only screen processing; and FIG. 15(b) is a diagram showing the same character string when both outline (edge) enhancement and suppression processing and halftone processing are made on the image data.

DETAILED DESCRIPTION OF THE PREFERRED EMBODIMENT

In the present preferred embodiment of the present invention, an example is described here of the application to a printer of an image processing apparatus in which the outline area containing edge parts is extracted from the input image data and also areas containing thin line structures are detected, image processing of enhancing or suppressing the outline (hereinafter referred to as outline (edge) enhancement and suppression processing) for the corrected area which is the outline area from which the area containing thin line structures is excluded, and contone (continuous tone) processing or screen processing is made for this outline enhanced or suppressed corrected area and selective output is made of one of these two which has the higher output value, and screen processing is made for all other areas and the result is output.

Figure 1:
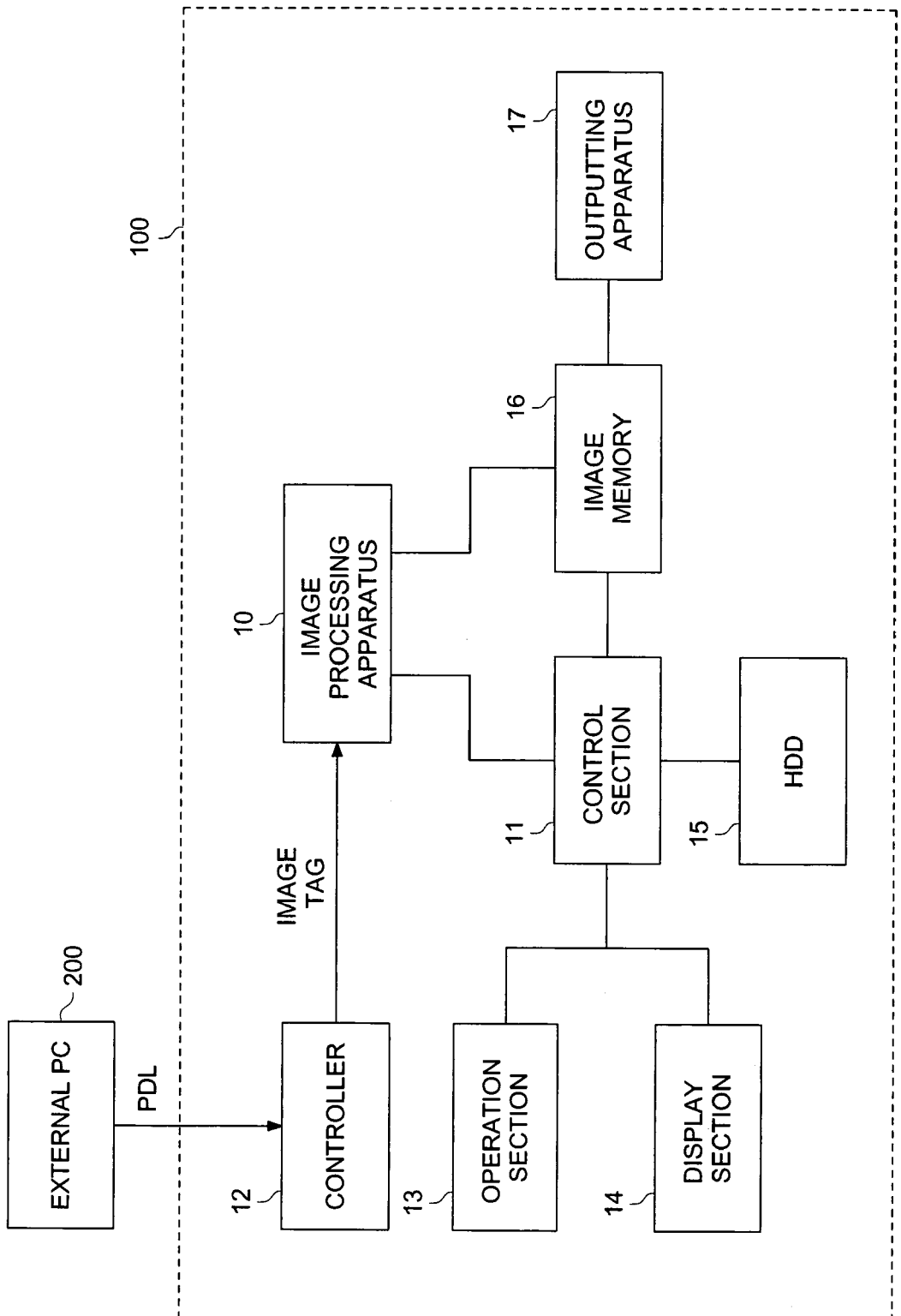
FIG. 1 is a diagram showing the internal configuration of the printer 100.

Firstly, the configuration is described below. The internal configuration of a printer 100 containing the image processing apparatus 10 according to the present preferred embodiment is shown in FIG. 1. The printer 100 is connected to the external PC (Personal Computer) 200 so that data communication is possible between them, and it prints out the image data sent from said external PC 200 in the PDL format, after carrying out image processing on said image data.

As is shown in FIG. 1, the printer 100 is configured to comprise the image processing apparatus 10 that carries out various types of image processing operations on the input image data that is input from the controller 12, the control section 11 that carries out central control of the different sections of the printer 100 following the different types of control programs stored in the HDD (Hard Disk Drive), the controller 12 that receives the PDL data from the external PC 200 and generates the image data and the image judgment signal for each pixel, the console section 13 for entering the operation instructions by the operator, the display section 14 that displays the operation screens, etc., the HDD 15 that stores various types of programs and the data of the results of processing, etc., the image memory 16 that stores the output image data after image processing, and the output device 17 that prints out the output image data.

The printer 100 receives the instruction for document printing from an application program (not shown in the figure) being executed in the external PC 200, and carries out the printing operations. The printing operations are carried out, for example, according to the following procedure. First, the application program sends the data of the document to be printed out to the printer driver software (not shown in the figure) within the external PC 200. The printer driver software converts the document data into the PDL format, and sends this data from the external PC 200 to the controller 12 inside the printer 100. The controller 12 rasterizes the document data converted into the PDL format and generates the image data IMAGE and the image judgment signal TAG for each pixel. Next, these are output to the image processing apparatus 10. The image processing apparatus 10 carries out image processing on the image data IMAGE that has been input and generates the output image data. Finally, the output image data generated by the image processing apparatus 10 is printed out by the output device 17.

Further, during the printing operations, when the parameters of image processing by the image processing apparatus 10 have been set via the operation section 13, the control section 11 sets the parameter values to be used during image processing based on the operation instructions, and stores them in the registers (to be explained later) within the image processing apparatus 10.

Figure 2:
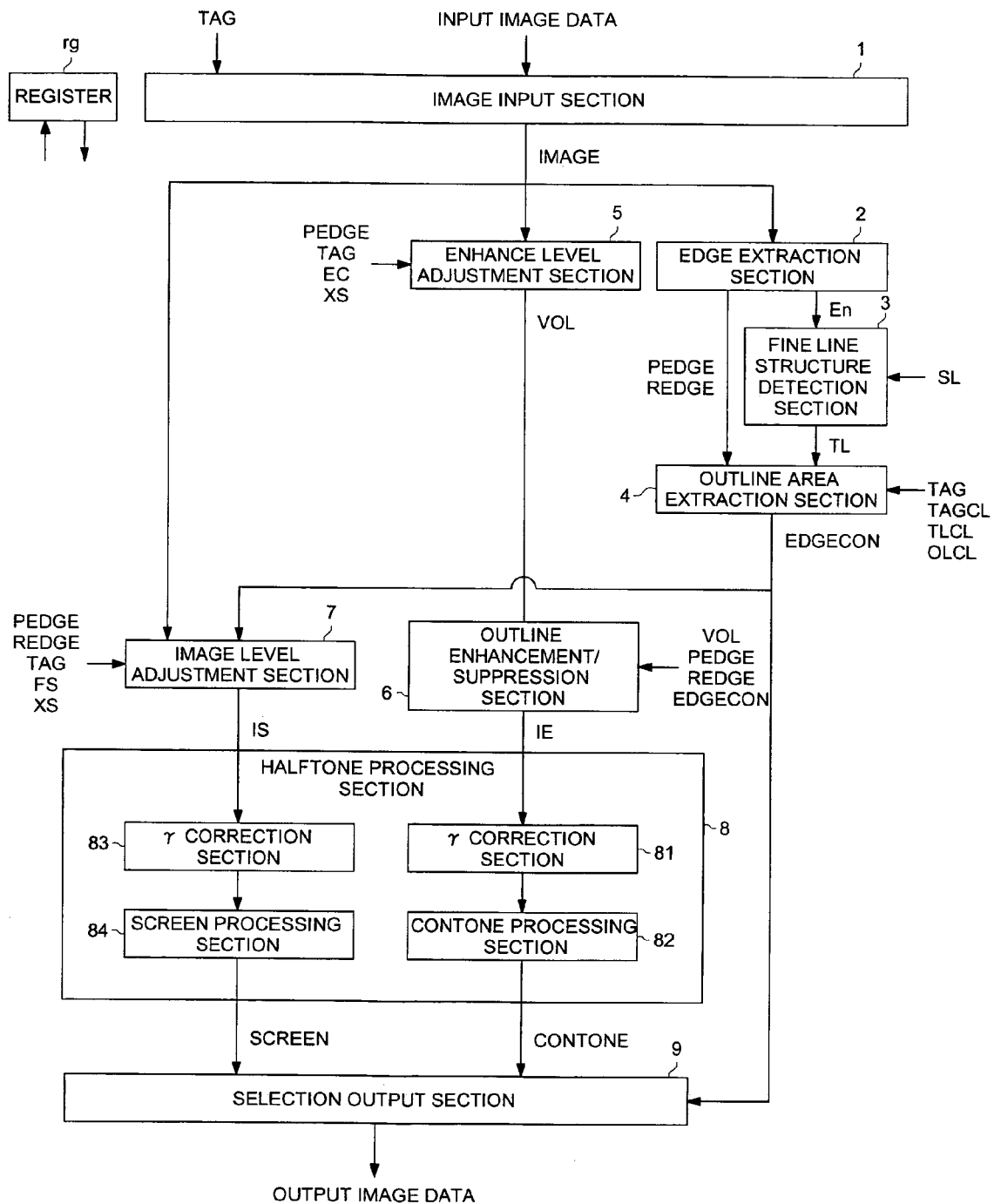
FIG. 2 is a diagram showing the functional configuration of the image processing apparatus 10 in the present preferred embodiment.

The image processing apparatus 10 according to the present embodiment is described below. FIG. 2 is a diagram showing the functional configuration of the image processing apparatus 10. As is shown in FIG. 2, the image processing apparatus 10 is configured to comprise the image input section 1, the register rg, the edge extraction section 2, the thin line structure detection section 3, the outline area extraction section 4, the enhancement level adjustment section 5, the outline (edge) enhancement and suppression section 6, the image level adjustment section 7, the halftone processing section 8, and the selection output section 9.

The image input section 1 inputs to the image processing apparatus 10 the input image data IMAGE (hereinafter referred to merely as the image data IMAGE) as well as the TAG signal indicating the attributes of each pixel constituting the image data IMAGE. The image input section 1 carries out color conversion of the image data IMAGE for each coloring material (here, these are the Y, M, C, and K coloring materials) used in the output apparatus 17, and successively outputs to the edge extraction section 2, the enhancement level adjustment section 5, and the image level adjustment section 7. At the time of making this output, the image data IMAGE is output for each pixel at a time. Further, in the present preferred embodiment, although the document data in the PDL format is taken to be rasterized in the controller 12, it is also possible to carry out rasterization in the image input section 1 and generate the image data IMAGE and the image judgment signal TAG for each pixel.

The register rg is a storage that memories the flag signals used as parameters in different sections, the data necessary for other operations, or the results of processing. Some concrete examples of parameters are, SL used in the thin line structure detection section 3, TNCL, TAGCL, OLCL, Wy, Wm, Wc, and Wk used in the outline area extraction section 4, AA, EC [AA] [TAG], XS [AA], TLSW [ch], and the vol function used in the enhancement level adjustment section 5, and BB, FS [BB], XS [BB], ATRAP, and the ias function, etc., used in the image level adjustment section 7. Some of these parameters can have fixed values set in advance, and the values of some of the parameters can be set as and when required in accordance with the operations instructions from the control section 13, and the details of the set values are described later. In addition, concrete examples of the results of processing are PEDGE [ch] and REDGE [ch] generated in the edge extraction section 2, TL generated in the thin line structure detection section 3, EDGECON [ch] generated in the outline area extraction section 4, and VOL [ch] generated in the enhancement level adjustment section 5. The details of these signals too are described later.

The edge extraction section 2 detects the edges from the image data IMAGE that has input, using the edge detection operator, and calculates the edge components En [ch] (ch=Y, M, C, K) at the target pixel for each of the colors Y, M, C, and K. In addition, based on the edge components, this section generates the positive edge signal PEDGE [ch] indicating the maximum value of the edge component when the pixel value of the target pixel is larger than those of its surrounding pixels, and the reverse edge signal REDGE [ch] indicating the maximum value of the edge component when the pixel value of the target pixel is smaller than those of its surrounding pixels. Even the signals PEDGE [ch] and REDGE [ch] are generated for each color.

The method of generating the signals En [ch], PEDGE [ch], and REDGE [ch] by the edge extraction section 2 is described below. Firstly, the surrounding pixels, with a 5 pixels×5 pixels mask size centering on the target pixel C, are extracted from the image data IMAGE using an edge detection operator. FIG. 3 shows an example of an image area of surrounding pixels extracted from the image data. For convenience of explanation, the peripheral pixels of the target pixel C are denoted by In (where n=0~24, excluding I12 which corresponds to the target pixel C). At this time, if the target pixel C is in the vicinity of the edge of the image area, and when parts outside the area of the image data are included in the 5 pixels×5 pixels area extracted by the edge detection operator, the pixel value 0 will be set at the pixel positions corresponding to such area outside the image data.

Next, the edge component values En [ch] are calculated according to Equation 1 below for each pixel by subtracting from the pixel value C [ch] of the target pixel C the pixel value C [ch] of each of the surrounding pixels I0~I24.

$$\left.\begin{array}{l} E0[ch] = C[ch] - I0[ch] \\ E1[ch] = C[ch] - I1[ch] \\ E2[ch] = C[ch] - I2[ch] \\ \vdots \\ E24[ch] = C[ch] - I24[ch] \end{array}\right\} \quad [\text{Eqn. 1}]$$

Next, the maximum value is obtained from among the edge components En [ch] obtained for the 8 pixels (I6~I8, I11, I13, and I16~I18) neighboring the target pixel C and this maximum value is taken as PEDGE [ch]. For example, among the eight pixels, if the edge component E11 of I11 is the maximum value, PEDGE [ch]=E11. However, if PEDGE [ch]<0, PEDGE [ch] is taken as 0.

On the other hand, when obtaining REDGE, using the following Equation 2, the pixel value of the target pixel C is subtracted from the pixel values of each of the surrounding pixels I0~I24 and the edge component in the negative direction −En [ch] is computed for each of the pixels (where n=0~24, excluding n=12).

$$\left.\begin{array}{l} -E0[ch] = I0[ch] - C[ch] \\ -E1[ch] = I1[ch] - C[ch] \\ -E2[ch] = I2[ch] - C[ch] \\ \vdots \\ -E24[ch] = I24[ch] - C[ch] \end{array}\right\} \quad [\text{Eqn. 2}]$$

Next, the maximum value is obtained from among the edge components in the negative direction −En [ch] obtained for the 8 pixels (I6~I8, I11, I13, and I16~I18) neighboring the target pixel C and this maximum value is taken as REDGE [ch]. For example, among the eight pixels, if the edge component −E6 of I6 is the maximum value, REDGE [ch]=−E6. However, if REDGE [ch]<0, REDGE [ch] is taken as 0.

As described above, the edge extraction section 2 generates for each coloring material the signal En [ch] indicating the edge intensity at the target pixel C as well as the signals PEDGE [ch] and REDGE [ch], and outputs the so generated signal En [ch] to the thin line structure detection section 3 along with the image data IMAGE, and outputs the PEDGE [ch] and REDGE [ch] signals to the outline area extraction section 4 along with the image signal IMAGE.

The thin line structure detection section 3 detects thin line structures from the image data IMAGE that has been input, and generates for each of the coloring materials Y, M, C, and K the flag signal TL [ch] indicating that it is a thin line structure. Later on, in the outline (edge) enhancement and suppression section 6, although outline (edge) suppression processing is made by reducing the output levels of the pixel values in the outline area, that is, conversion is made to thin lines, if all parts having edges are handled as outlines, the conversion to thin lines will be made even for outline areas that are originally composed of thin lines such as lines of width equal to 2 pixels or less. As a result, since the thin line sections of text characters or line drawings will either become faded or erased at the time the image data IMAGE is output, it is necessary to carry out control so that the conversion to thin lines is not made at least in areas having thin line structures with such thin lines of widths of two pixels or less, even if they are outline areas. Therefore, the areas with thin line structures having lines that are less than pixels (or less than 4 pixels according to the portion of the image) are detected by the thin line structure detection section 3 and the results of that detection are output to the outline area extraction section 4, thereby excluding areas with thin line structures from the target of the subsequent processing of conversion to thin lines in the outline (edge) enhancement and suppression section 6.

The method of generating the TL [ch] signal is described below. It is possible to detect thin line structures using the thin line detection operators op2~op5 shown in FIG. 4. The thin line operators op2~op5 are those set in the pixel positions indicated in the figure by A, B, C, D, E, F, and G, respectively, in the 5 pixels×5 pixels area centering on the target pixel C. Using such thin line structure detection operators op2~op5, and by judging whether an edge is present at the positions A or B, and also judging whether or not an edge is present at the positions D or E, the decision is made of whether or not two edges are present at opposite positions with the target pixel C in the middle (such two edges in opposing positions constitute what is called an edge pair). In addition, by judging whether or not the three contiguous pixels, that is, the pixels corresponding to F and G and the target pixel C, have nearly the same values, that is, by judging that F and G are both edges or are both not edges, the judgment is made of the continuity in a direction at right angles to the edge pair. In other words, using the thin line detection operators op2~op5, it is possible to detect a thin line structure having a line width of 2 to 3 pixels in four directions with the target pixel C being at the center.

The method of detecting thin line structures using the above mentioned thin line detection operators op2~op5 is explained below using the image area shown in FIG. 3 as an example. Firstly, edge recognition is made based on the different edge components En obtained in the edge extraction section 2 for the surrounding pixels In (n=0~24) of the target pixel C, and the flag signal dedge [ch] [n] indicating whether or not it is an edge is set for each surrounding pixel In. Each edge component En is compared with a threshold value SL prepared beforehand for edge recognition, and if En>SL, that surrounding pixel In is taken to belong to an edge and the value of the signal dedge [ch] [n] for that In is set as "1." On the other hand, if En≦SL that surrounding pixel In is taken not to belong to an edge and the signal dedge [ch] [n] is set to "0." Further, SL is a coefficient indicating the minimum necessary level difference between adjacent pixels to be judged as belonging to an edge.

When dedge [ch] [n] has been set for all the surrounding pixels In, referring to the set values of dedge [ch] [n], and using the thin line detection operators op2~op5 described above, a check is made of the presence or absence of edge pairs at two opposite ends containing the target pixel C at the middle for a 5 pixels×5 pixels image area with the target pixel C at the center, and also a check is made of the presence or absence of continuity in a direction at right angles to the edge pair. If, as a result of this check, it is found that an edge pair exists and also that there is continuity in a direction at right angles to the edge pair, then that image area is taken to contain a thin line structure and setting TL [ch]=1 is made. In all other cases, the setting TL [ch]=0 is made taking that the image area does not contain a thin line structure.

For example, when applying the thin line detection operator op2, among the surrounding pixels In centering on the target pixel C, the pixel I10 corresponds to A of the thin line detection operator op2, pixel I11 corresponds to B, pixel I13 corresponds to D, pixel I14 corresponds to E, pixel I17 corresponds to F, and pixel I7 corresponds to G.

Therefore, if either one of dedge [ch] [10] or dedge [ch] [11] is "1" and also if either one of dedge [ch][13] or dedge [ch] [14] is "1," and also if dedge [ch] [17]=dedge [ch] [7], the flag TL [ch] will be set to "1" taking that there is a thin line structure, and the flat TL [ch] will be set to "0" in all other cases.

When applying the thin line detection operator op3, among the surrounding pixels In centering on the target pixel C, the pixel I20 corresponds to A of the thin line detection operator op3, pixel I16 corresponds to B, pixel I8 corresponds to D, pixel I4 corresponds to E, pixel I6 corresponds to F, and pixel I18 corresponds to G.

Therefore, if either one of dedge [ch] [20] or dedge [ch] [16] is "1" and also if either one of dedge [ch] [8] or dedge [ch] [4] is "1," and also if dedge [ch] [6]=dedge [ch] [18], the flag TL [ch] will be set to "1" taking that there is a thin line structure, and the flat TL [ch] will be set to "0" in all other cases.

When applying the thin line detection operator op4, among the surrounding pixels In centering on the target pixel C, the pixel I22 corresponds to A of the thin line detection operator op4, pixel I17 corresponds to B, pixel I7 corresponds to D, pixel I2 corresponds to E, pixel I11 corresponds to F, and pixel I13 corresponds to G.

Therefore, if either one of dedge [ch] [22] or dedge [ch] [17] is "1" and also if either one of dedge [ch] [7] or dedge [ch] [2] is "1," and also if dedge [ch] [11]=dedge [ch] [13], the flag TL [ch] will be set to "1" taking that there is a thin line structure, and the flat TL [ch] will be set to "0" in all other cases.

When applying the thin line detection operator op5, among the surrounding pixels In centering on the target pixel C, the pixel I24 corresponds to A of the thin line detection operator op5, pixel I18 corresponds to B, pixel I6 corresponds to D, pixel I0 corresponds to E, pixel I16 corresponds to F, and pixel I8 corresponds to G.

Therefore, if either one of dedge [ch] [24] or dedge [ch] [18] is "1" and also if either one of dedge [ch] [6] or dedge [ch] [0] is "1," and also if dedge [ch] [16]=dedge [ch] [8], the flag TL [ch] will be set to "1" taking that there is a thin line structure, and the flat TL [ch] will be set to "0" in all other cases.

Further, the setting of the flag TL [ch] is not made based merely on the result of detection made by the thin line detection operators op2~op5, but the number of conjunction is obtained between the target pixel C and the surrounding pixels In (n=6, 7, 8, 11, 13, 16, 17, and 18), and the decision of whether or not a thin line structure is present is made based on the number of conjunction so obtained, and when it is determined that a thin line structure is present based on the result of this judgment, the flag signal TL [ch] can be set to "1." The number of conjunction is the number of surrounding pixels with which the target pixel is coupled, when a coupling is taken to exist between the target pixel and a surrounding pixel if there is no edge between the two of them.

In concrete terms, the number of conjunction J is obtained by subtracting from the total number of neighboring pixels (=8) the sum of the values of dedge [ch] [n] set respectively for each of the adjacent pixels In (n=6, 7, 8, 11, 13, 16, 17, and 18) of the target pixel C. In other words, the number of conjunction J is obtained using Equation 3 given below.

$$J[ch] = 8 - (dedge[6] + dedge[7] + dedge[8] + dedge[11] + dedge[13] + dedge[16] + dedge[17] + dedge[18]) \quad [\text{Eqn. 3}]$$

Here, the decision of whether or not the obtained number of conjunction J≧6 is made, and if J≧6 it is judged that the target pixel C does not have an edge but the edge is present in its surroundings, in other words, that the target pixel C is not an outline area but is positioned within a line and that the area is a thin line structure, and hence, the value of TL [ch] is set forcibly to "1" irrespective of its value set earlier by the thin line detection operators op2~op5.

Even in the case of a thin line, since it is possible that the line width would have become thick only in a localized section where two thin lines intersect or where a thin line branches off into two lines, it is possible to further increase the accuracy of thin line detection by judging whether it is a thin line having several edges by obtaining the number of conjunction J.

After the above thin line detection operation is carried out by scanning the target pixel C over the entire area thereby generating the value of TL [ch] for all the pixels, the thin line structure detection section 3 outputs the TL [ch] signals so generated to the outline area extraction section 4.

The outline area extraction section 4 extracts the outline area from the image data IMAGE that has been input, and generates for each of the coloring materials Y, M, C, and K the flag signal EDGECON [ch] for controlling whether or not the outline enhancement or suppression operation has to be made for the outline area so extracted.

Figure 5:
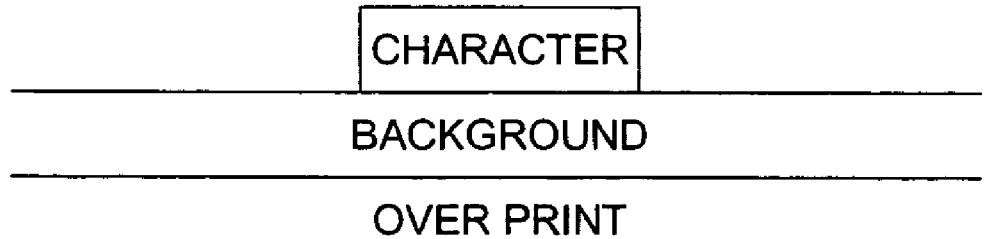
FIG. 5(a) is a diagram showing an example of over-print.
FIGS. 5(b) and 5(c) are diagrams showing examples of knock-out.
Figure 5:
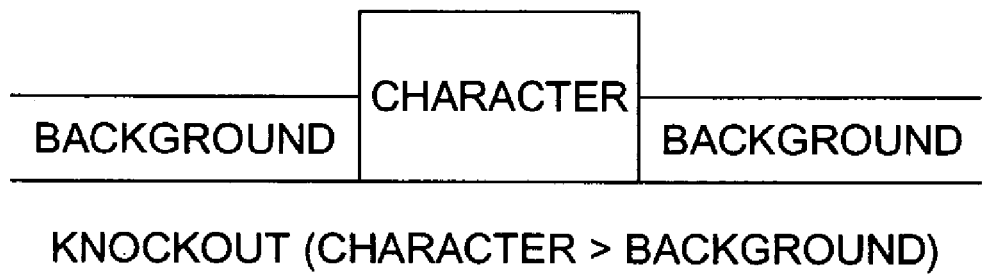
Figure 5:
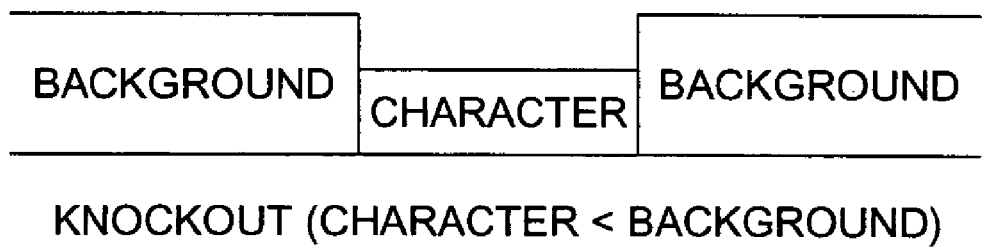

For example, printing a text character with the coloring material K on a background of the coloring material Y, that is, printing a text character on a background as shown in FIG. 5(a) is called overprinting and the examples shown in FIGS. 5(b) and 5(c) of not printing the background color in the text character printing area are called knock outs. In the case of an overprint, since the background color Y has a constant density, edges will be present only in the text character area. However, in the case of a knock out, since edges will be present only in the text character area but also in the background, it will be necessary to judge whether or not to carry out outline enhancement or suppression for both the text character part and the background part.

Here, an edge for which the value of the target pixel is greater than the value of the surrounding pixels is called a high edge and an edge for which the value of the target pixel is less than the value of the surrounding pixels is called a low edge, and in the outline enhancement and suppression section 6 the enhancement or suppression is made for the outline area of high edges.

Figure 6:
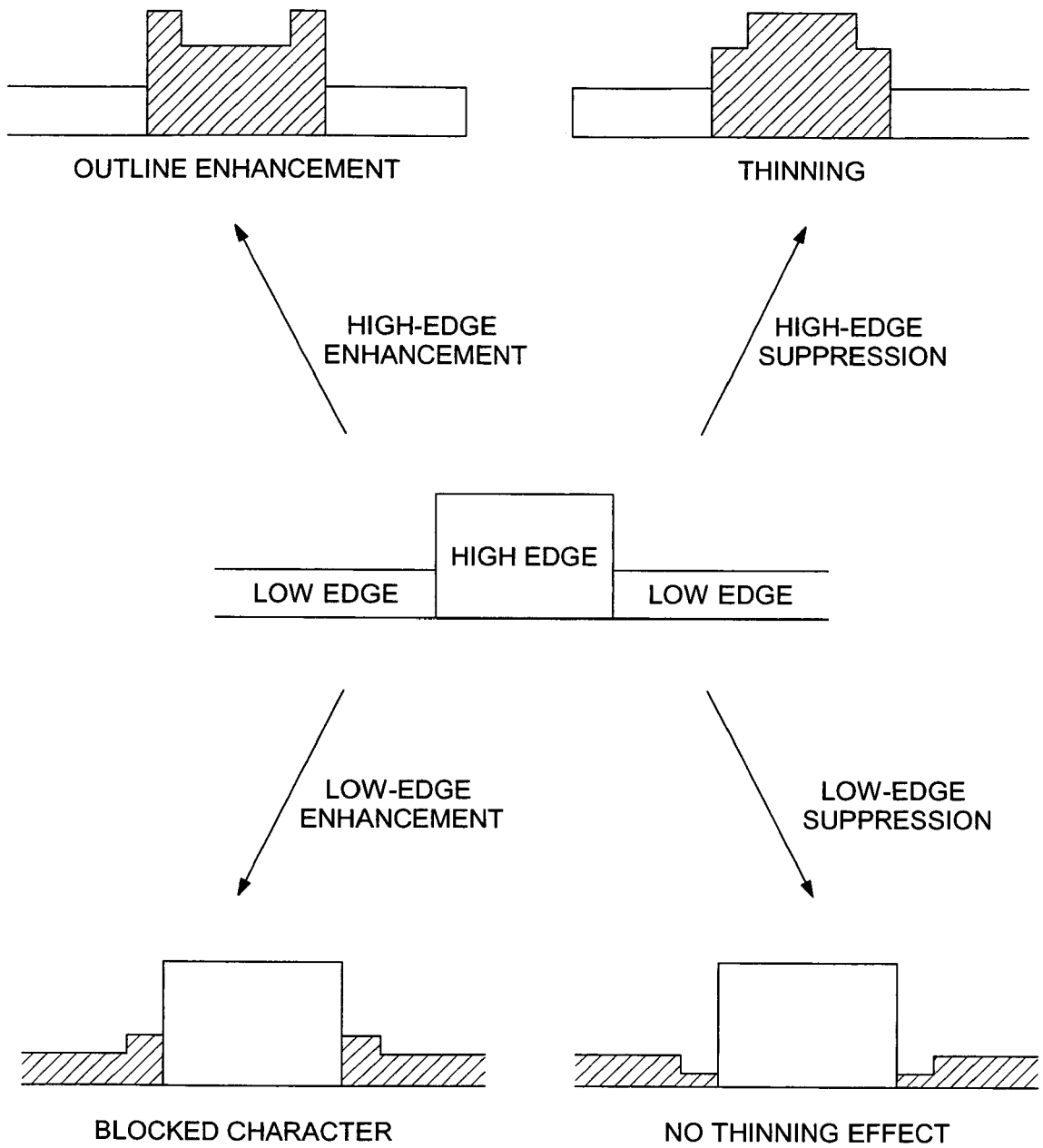
FIG. 6 shows an example of adjusting the output level of pixel values in high-edge and low-edge enhancement and suppression operations.

This is because, as is shown in the concrete example in FIG. 6, in the case when the text character part is of higher density than the background (the edges of the text character are high edges and the edges of the background are low edges), if the high edge side is taken as the target outline area for processing, the outline can be enhanced or can be converted into thin lines by increasing or decreasing the output values of the pixel values in the outline area on this high edge side. On the contrary, when the output level is adjusted in the outline area on the low edge side (the edges on the background side), since the area outside the text characters is taken as the outline if enhancement is made, the line widths of the text characters becomes thick, and conversion to thin lines cannot be made even if the output level is decreased. This is also true even when the background is of higher density than the text characters as is shown in FIG. 5(c) (the background side has high edges and the text character side has low edges), and although it is possible to carry out enhancement or, suppression (conversion to thin lines) of the outline by taking the edges in the background side, that is, the outline area in the high edge side as the target of outline processing, the characters will become faint if the edges in the text character side, that is, the outline area in the low edge side are taken as the target of processing.

In other words, between the text characters and the background, it is necessary to select as the target of outline enhancement or suppression processing the side that has the higher density, and at this time always the outline area on the high edge side will become the target of processing.

Here, the outline area extraction section 4 first determines which side between the text character side and the background side is the higher density side. Since being the higher density side means that the side has a visually higher contrast, the index values Tpedge and Tredge are obtained as indicators of visual contrast of the edges in the text character area and the background area.

Tpedge and Tredge are calculated according to the following equations.

$$Tpedge = PEDGE[y] \times Wy + PEDGE[m] \times Wm + PEDGE[c] \times Wc + PEDGE[k] \times Wk \qquad [\text{Eqn. 4}]$$

$$Tredge = REDGE[y] \times Wy + REDGE[m] \times Wm + REDGE[c] \times Wc + REDGE[k] \times Wk \qquad [\text{Eqn. 5}]$$

Where the coefficients Wy, Wm, Wc, and Wk satisfy the criterion Wy+WM+Wc+Wk=1.

In other words, Tpedge and Tredge are edge intensities of each of the coloring materials Y, M, C, and K weighted by the coefficients Wy, Wm, Wc, and Wk corresponding to the luminosities in the text character area and in the background area, respectively. Tpedge is calculated using PEDGE [ch] indicating the edge intensities of high edges, and Tredge is calculated using REDGE [ch] indicating the edge intensities of low edges, and both are integers in the range 0~255. In order to obtain the visual contrast, it is sufficient to apply the coefficients Wy, Wm, Wc, and Wk corresponding to the relative luminosities. For example, the visual contrast in the case of the color Y is low even at the maximum density compared to the other colors. In contrast, the color K has the highest visual contrast among the four colors of Y, M, C, and K. Reflecting this relationship, by setting the values of the different coefficients as Wc=2/8, Wm=2/8, Wy=1/8, and Wk=3/8, it is possible to obtain values of Tpedge and Tredge in accordance with the luminosities. In addition, it is also practical to use the same weighting coefficients for all the different colors, and hence it is possible to set Wy=Wm-=Wc=Wk=1/4.

After obtaining Tpedge and Tredge, Tpedge and Tredge are compared, and based on the result of that comparison, the value of EDGECON [ch] is set as "0" indicating the exclusion from being the target of outline enhancement and suppression processing in the outline enhancement and suppression processing section 6, or as "1" indicating the target of outline enhancement and suppression processing, and "2" indicating not only excluding from being the target of outline enhancement and suppression processing but also being the target of contone processing for outline areas containing thin line structures in the halftone processing section 8. The condition for the target pixel C being in the high density side is Tpedge>Tredge, and since the likelihood of the pixel having a high density is high if this condition is satisfied, it is taken as a target for outline enhancement and suppression processing.

Explanations are given in the following regarding the flow of processing at the time of setting EDGECON [ch] referring to the flow chart shown in FIG. 7. The various flag signals TL [ch], TAG, TLCL, TAGCL, and OLCL are used at the time of setting EDGECON [ch]. TL [ch] is a flag signal used for judging whether or not the area contains a thin line structure, and is generated in the thin line structure detection section 3 described above. TAG is an image attribute signal that is input simultaneously with the image data IMAGE, and has set in it any one of the values of "0" indicating that the pixel belongs to an Image (line drawing) area, or "1" indicating that the pixel belongs to a Graphics (photographic image) area, or "2" indicating that the pixel belongs to a Text (characters) area. TLCL is a flag that controls the validity of TL [ch] and one of the values of "0" indicating that TL [ch] is to be made valid, or "1" indicating that TL [ch] is to be made invalid unconditionally, or "2" indicating that areas containing thin line structures should be excluded from outline area enhancement and suppression processing, according to the operation instructions from the operator. TAGCL is a flag that controls the validity of the TAG flag signal and is set to "1" when there is an operation instruction from the operator to carry out unconditionally the outline enhancement and suppression processing irrespective of the attributes of the image. Further, OLCL is a flag signal for carrying out control so that outline enhancement and suppression processing is avoided, and is set to "1" when there is an operation instruction from the operator instructing not to carry out outline enhancement and suppression processing for the entire image area.

Figure 7:
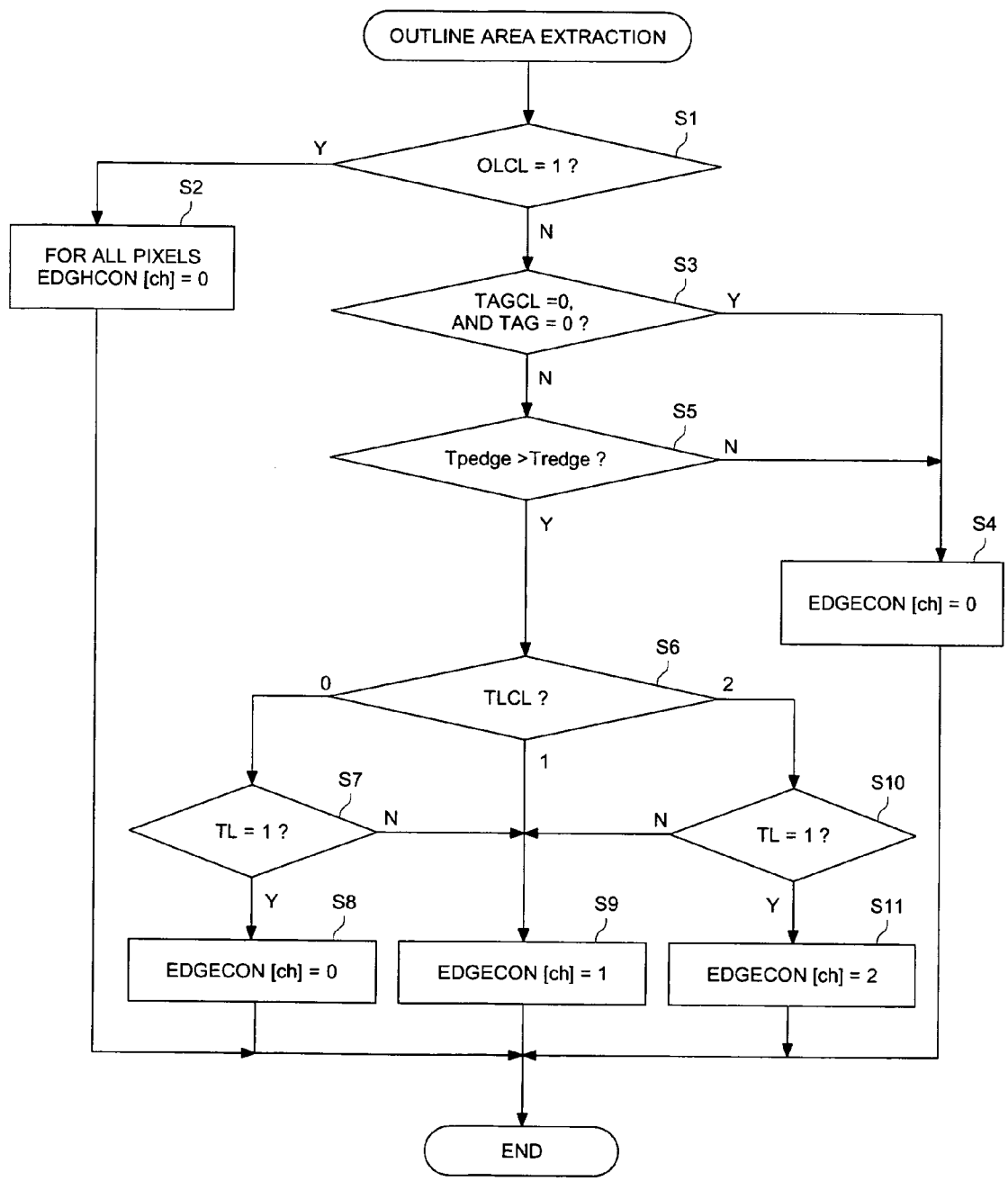
FIG. 7 is a flow chart explaining the method of extracting the corrected area in the outline area extraction section.

As is shown in FIG. 7, to begin with the outline area extraction section 4 refers to OLCL and judges whether or not OLCL=1 (Step S1). When OLCL=1 (Step S1: Y), EDGECON [ch]=0 is set forcibly for the entire image area (Step S2) thereby controlling so that outline enhancement and suppression processing is not made for the entire image data IMAGE and also so that screen processing is made for the entire image in the halftone processing section 8. On the other hand, if OLCL≠1 (Step S1: N), the flag signals TAGCL and TAG are referred to and the decision is made whether TAGCL=0 and also TAG=0 (Step S3). When TAGCL=0 and also TAG=0 (Step S3: Y), it implies that it has been instructed to refer to TAG and also that TAG is IMAGE, and from this it is judged that there are no text characters included in the image, and EDGECON [ch]=0 is set forcibly for the target pixel C (Step S4) thereby controlling so that outline enhancement and suppression processing is not made.

When the condition TAGCL=0 and also TAG=0 is not met (Step S3: N), Tpedge and Tredge are compared and the decision is made of whether or not Tpedge>Tredge (Step S5). If the condition Tpedge>Tredge is not satisfied but Tpedge≦Tredge (Step S5: N), it is judged that the target pixel C is on the low density side and EDGECON [ch]=0 is set forcibly for the target pixel C (Step S4) thereby controlling so that outline enhancement and suppression processing is not made.

On the other hand, if Tpedge>Tredge (Step S5: Y), the target pixel C is judged to be on the high density side. Therefore, TLCL is checked to see if one of the values "0," "1," or "2" has been set in it (Step S6).

First, explanation is given for the case when the setting TLCL=0 has been made. When the setting TLCL 0 has been made (Step S6: 0), TL [ch] is taken to be valid and is checked to see whether or not TL [ch]=1 (Step S7). If TL [ch]=1 (Step S7: Y), since it implies that the target pixel C is on the high density side and also that the area contains a thin line structure, the setting EDGECON [ch]=0 is made (Step S8) for the target pixel C, thereby controlling so that it is excluded from the outline enhancement and suppression processing. On the other hand, if TL [ch]≠1 (Step S7: N), since it implies that although the target pixel C is on the high density side it does not contain any thin line structures, the setting EDGECON [ch]=1 is made for the target pixel C (Step S9) thereby controlling so that it is made a target for outline enhancement and suppression processing.

Next, the case when TLCL=1 has been set is described here. When the TLCL flag has been set to "1" (Step S6: 1), TL [ch] is taken to be invalid, and irrespective of whether or not there is a thin line structure at the target pixel C, and EDGECON [ch] for the target pixel C is set as "1" considering the target pixel C to be on the high density side (Step S9), thereby controlling so that outline enhancement and suppression processing is carried out.

Next, the case when TLCL=2 has been set is described here. When the TLCL flag has been set to "2" (Step S6: 2), TL [ch] is taken to be valid, and by referring to TL [ch] a judgment is made as to whether or not TL [ch]=1 (Step S10). If TL [ch] has been set to "1" (Step S10: Y), the setting EDGECON [ch]=2 is made for the target pixel C (Step S11), and since the target pixel C is on the high density side and also has thin line structures, it is excluded from the outline enhancement and suppression processing, and control is carried out so that subsequently it is subjected to contone processing in the halftone processing section 8. On the other hand, if TL [ch] is not equal to 1 (Step S10: N), since the target pixel is on the high density side and does not have any thin line structures, the setting EDGECON [ch]=1 is made for the target pixel C (Step S9) thereby controlling so that it is made a target for outline enhancement and suppression processing.

As has been explained above, the outline area extraction section 4 sets one of the values of 0, 1, and 2 in the EDGECON [ch] flag for the target pixel, repeats this process for the entire image area and sets all the values of EDGECON [ch]. Next, the EDGECON [ch] flag signal so set is output to the outline enhancement and suppression section 6, the image level adjustment section 7, and the selection output section 9.

The enhancement level adjustment section 5 generates for each of the coloring materials Y, M, C, and K the VOL [ch] signal indicating the extent of enhancement or suppression to be carried out during the outline enhancement and suppression processing by the outline enhancement and suppression section 6.

Figure 8:
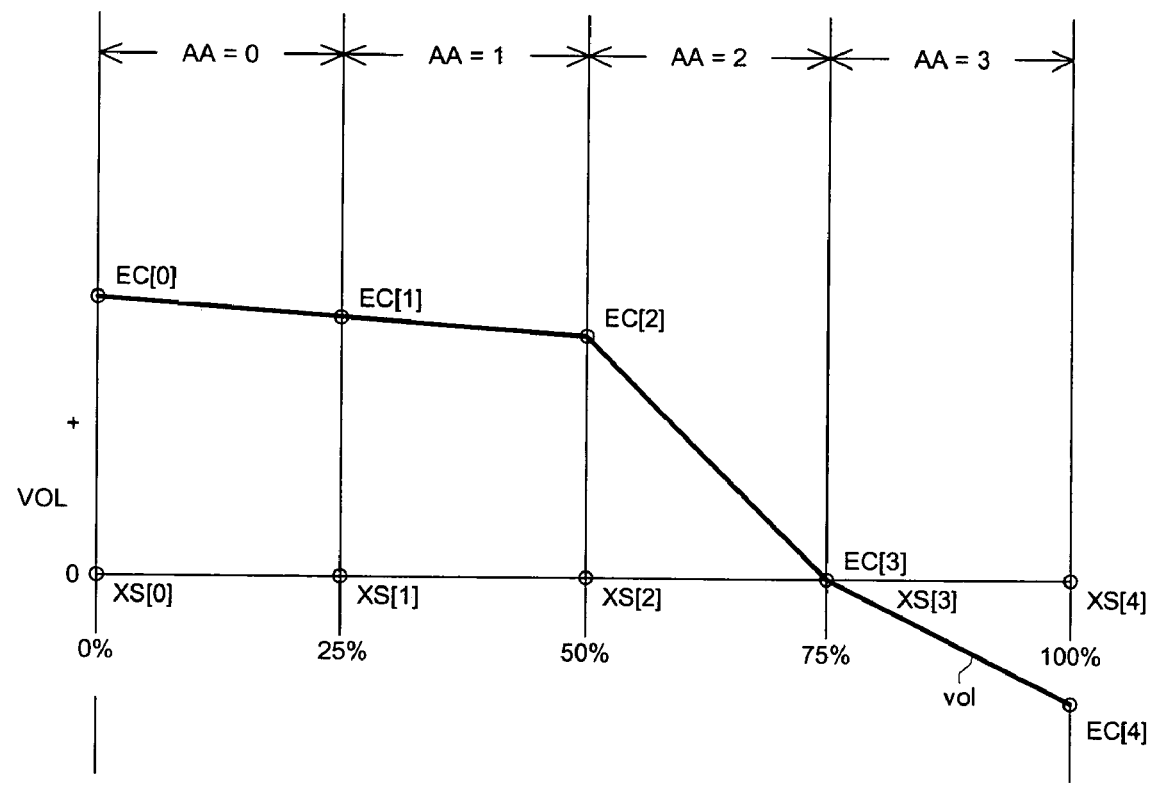
FIG. 8 is a diagram showing the "vol" function.

The VOL [ch] signal values are obtained by the vol function shown in FIG. 8. The function vol shown in FIG. 8 is one that outputs the output value VOL [ch] corresponding to the input value which is taken to be the input level (indicated by 0~100%) of the pixel value of the image data. Positive values of VOL [ch] indicate the extent of enhancement and negative values indicate the degree of suppression to be made.

The vol function is designed so that, in the region in which the pixel value input level is low being 0~75%, the output value VOL [ch] becomes large so that the output level of the pixel value becomes large in order to enhance the outline. On the contrary, in order to carry out conversion to thin lines in the areas with high levels of the pixel values with input values closer to 100%, this function is designed to make large the output value VOL [ch] in the negative direction taking 75% as the border line, that is, in order to increase the degree of suppression. As a consequence, the extent of enhancement or suppression of the outline is determined based on the input level of the pixel value.

The vol function is described hereinafter. As is shown in FIG. 8, the pixel values of the image data are divided into segments of 25% each and are indicated by AA so that the segment 0~25% is denoted by AA=0, the segment 25~50% is denoted by AA=1, the segment 50~75% is denoted by AA=2, and the segment 75~100% is denoted by AA=3, and the pixel values at the boundary points of the different segments AA, that is, the pixel values at 0%, 25%, 50%, 75%, and 100% are denoted by XS [AA]. Further, the output values EC [AA] [TAG] are set beforehand corresponding to each XS [AA] for each TAG and these are stored in the register rg. At this time, by setting EC [AA] [TAG] according to the attributes of the image, it is possible to control the degree of enhancement (or the degree of suppression) according to the attributes of the image.

The vol function is a linear interpolation function of the different output values EC [AA] [TAG], and is expressed by Equation 6. It is possible to obtain the output value VOL [ch] by inputting the input level of the pixel value of the target pixel C in the vol function expressed by Equation 6.

$$VOL[ch] = EC[AA][TAG] + \frac{(EC[AA+1][TAG] - EC[AA][TAG]) \times (MAXC - XS[AA])}{64} \quad \text{[Eqn. 6]}$$

At this time, if the pixel value of the target pixel C that is input to the vol function is denoted by MAXC, while it is possible to use the pixel value C [ch] for each color independently in the case of an image data having the Y, M, C, and K colors, it is also possible to select the pixel value C [ch] of the color that shows the maximum value among all the colors and use it as the value common to all the colors. At the time of computing VOL [ch], the flag signal CVOL is used for the selection control of either the setting of using the pixel value C [ch] for each color independently or the setting of using the pixel value c [ch] of the color that has the highest value among all colors. CVOL is set to 1 when the operator carries out an operation of setting CVOL so as to select the use of common pixel value for all colors, and, on the other hand, CVOL is set to 0 when the operator carries out an operation of setting CVOL so as to select the use of pixel values independently for each color, and this value is stored in the register rg.

Further, the switch signal TLSW [ch] has been provided for selecting whether the outline suppressing processing, that is, processing of conversion to thin lines, is to be done separately for each color, and this switch is set to 0 or 1 by the operator and is stored in the register rg. The switch values of TLSW [ch] for each color is referred to at the time of computing VOL [ch], and VOL [ch] is calculated using the output value EC [4] [TAG] when TLSW [ch] has been set to 1, and when TLSW [ch] has been set to 0, VOL [ch] is calculated using the output value 0 instead of the output value EC [4] [TAG].

The method of calculating VOL [ch] using the vol function is described hereinafter. To begin with, the enhancement level adjustment section refers to CVOL and judges whether or not CVOL is equal to 1. If CVOL is equal to 1, the setting MAXC=Max (C [Y], C [M], C [C], C [K]) is made and the common pixel value C [ch] is used for all color as the value of MAXC. Here, Max (x) is a function indicating that the maximum value among the elements within the parentheses. On the other hand, if CVOL is not equal to 1, the setting MAXC=C[ch] is made and the pixel value C [ch] of each color is used independently as the value of MAXC. Next, MAXC and XS [AA] are compared, and the segment AA (AA=0, 1, 2, 3, 4) to which MAXC applies is calculated as AA=0 if MAXC<XS [1], as AA=1 if XS [1]≦MAXC<XS [2], as AA=2 if XS [2]≦MAXC<XS [3], as AA=3 if XS [3]≦MAXC<XS [4], as AA=4 if XS [4]≦MAXC.

Next, TAG is referred to, the output values EC [AA] [TAG] and EC [AA+1] [TAG] corresponding to TAG and AA are obtained from the register rg, and VOL [ch] is computed by entering these output values EC [AA] [TAG] and EC [AA+1] [TAG] and the pixel value C [ch] in the above Equation 6. At this time, the enhancement level adjustment section 5 refers to the switch TLSW [ch] and, if the setting TLSW [ch]=1 has been made, computes VOL [ch] using the output value EC [4] [TAG]. In other words, it adjusts the degree of outline (edge) suppression so as to carry out conversion to thin lines. Also, if the setting TLSW [ch]=0 has been made, it computes the VOL [ch] using the output value "0" instead of using the output value EC [4] [TAG]. In other words, VOL [ch] becomes 0 and hence adjusting so that no conversion to thin lines is carried out. Because of using TLSW [ch] in this manner, for example, by setting TLSW [Y]=0, TLSW [M]=0, TLSW [C]=0, and TLSW [K]=1, it is possible to control so that the conversion to thin lines is made only for the color K.

Furthermore, although it is satisfactory to obtain the output value VOL [ch] by inputting the pixel value MAXC in the vol function as described above, it is also possible to prepare an LUT (Look Up Table) consisting of the output values of the vol function corresponding to the input values and store this LUT in the register rg, and then to obtain the value of VOL [ch] corresponding to the pixel value C [ch] of the target pixel C by referring to the LUT at the time of calculating VOL [ch].

As described above, the enhancement level adjustment section 5 calculates the values of VOL [ch] indicating the degree of enhancement or suppression based on the input levels of the pixel values of all the pixels in the image area that is to be the target of outline enhancement and suppression, and once this VOL [ch] signal is generated it is output along with the image data IMAGE to the outline enhancement and suppression section 6.

The outline enhancement and suppression section 6 generates for each color the outline processed image data IE [ch] which is the image data IMAGE to which the outline enhancement and suppression processing has been made, based on the EDGECON [ch] signal generated by the outline area extraction section 4 and the VOL [ch] signal generated by the enhancement level adjustment section 5. If VOL [ch] has a positive value, the outline enhancement and suppression processing consists of outline enhancement by increasing the output level of the outline area, and if VOL [ch] has a negative value, the output level of the outline area is reduced thereby carrying out outline (edge) suppression processing, that is, carrying out conversion to thin lines. Since whether to enhance or to suppress the outline is determined by the value of the VOL [ch] signal, the processing of enhancing the outline and the processing of suppressing the outline are treated here as one and the same processing.

Figure 9:
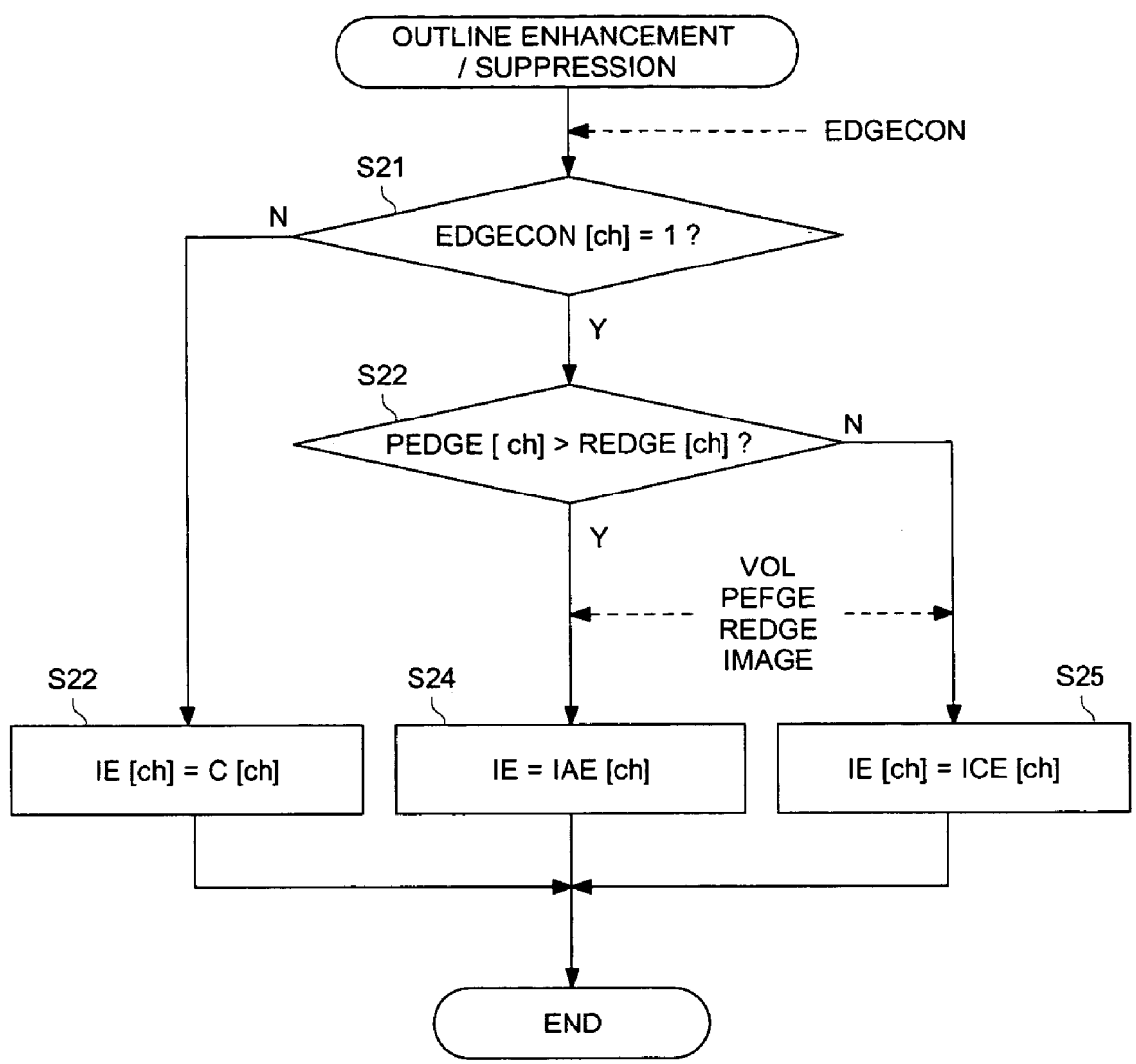
FIG. 9 is a flow chart explaining the method of generating the level adjustment image data IS [ch] in the outline (edge) enhancement and suppression processing section 6.

The method of generating the outline processed image data IE [ch] is explained here while referring to FIG. 9. To begin with, the outline enhancement and suppression section 6 refers to the EDGECON [ch] signal, and decides whether or not EDGECON [ch] is 1, that is, whether or not the target pixel C has been made the target of outline enhancement and suppression processing (Step S21). In case EDGECON [ch] is not equal to 1 (Step S21: N), that is, if EDGECON [ch] is either 0 or 2, since it implies that the target pixel has not been made the target of this processing, no outline enhancement or suppression processing is made and the pixel value C [ch] of the target pixel C in the original image data is set in the output data of this section, that is, the setting IE [ch]=C [ch] is made (Step S22).

On the other hand, when EDGECON [ch] is 1 and the target pixel C has been made the target of outline enhancement and suppression processing (Step S21: Y), the judgment is made of whether or not PEDGE [ch]is greater than REDGE [ch], that is, of whether or not the high edge side of the edge is higher than the low edge side (Step S23), and if PEDGE [ch] is greater than REDGE [ch] and the high edge side is higher (Step S23: Y), then PEDGE [ch] and VOL [ch] are used for computing IE [ch] with only the output level of VOL [ch] being adjusted in the outline area, and the pixel value after outline enhancement or suppression IAE [ch] is calculated using Equation 7 given below, and the setting IE [ch]=IAE [ch] is made (Step S24). Further, if PEDGE [ch] is not greater than REDGE [ch], that is, if PEDGE [ch]≦REDGE [ch] and the low edge side is higher (Step S23: N), then REDGE [ch] and VOL [ch] are used for computing IE [ch] with only the output level of VOL [ch] being adjusted in the outline area, and the pixel value after outline enhancement and suppression ICE [ch] is calculated according to Equation 8 given below and the setting IE [ch]=ICE [ch] is made (Step S25).

$$IAE[ch]=C[ch]+(PEDGE[ch] \times VOL[ch])/128 \qquad \text{[Eqn. 7]}$$

$$ICE[ch]=C[ch]+(REDGE[ch] \times VOL[ch])/128 \qquad \text{[Eqn. 8]}$$

In other words, the outline enhancement and suppression section 6 generates for each color the outline processed image data IE [ch] for which outline enhancement and suppression has been made, only for the area (referred to hereinafter as the corrected area) of the outline area containing the edges from which the thin line structure areas have been excluded. Thereafter, the generated outline processed image data IE [ch] is output to the halftone processing section 8.

The image level adjustment section 7 generates the level adjusted image data IS [ch] from the image data IMAGE by adjusting the output level for halftone processing. In concrete terms, IS [ch] is generated by selectively outputting the output level adjusted pixel value IAS [ch] for the outline area and the unprocessed pixel value C [ch] for all other areas.

Figure 10:
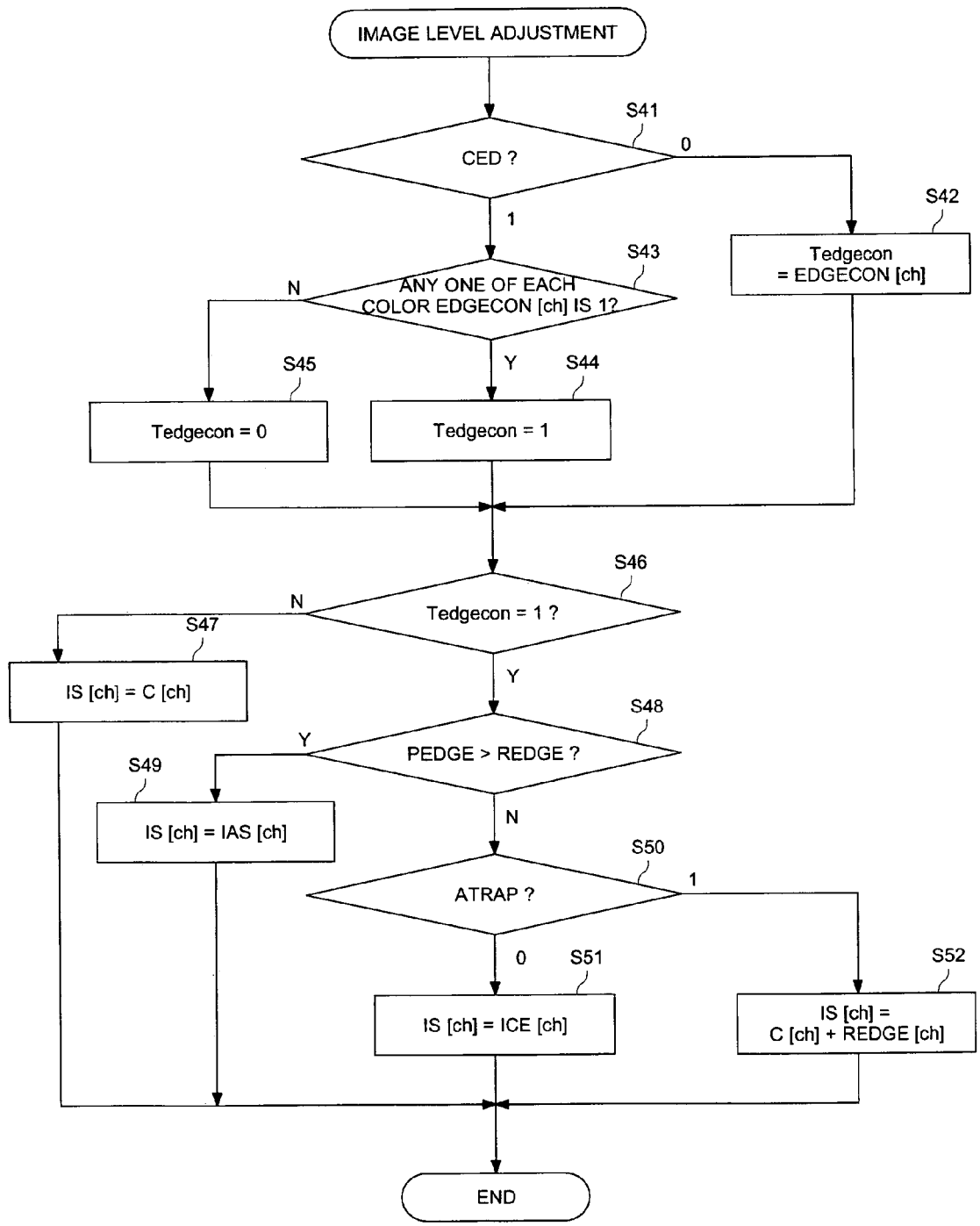
FIG. 10 is a flow chart explaining the method of generating the outline processing image data IE [ch] in the image level adjustment section 7.

The method of generating the level adjusted image data IS [ch] by the image level adjustment section 7 is described here referring to FIG. 10. At the time of generating the level adjusted image data IS [ch], its generation is controlled using the flag signals Tedgecon and ATRAP. Tedgecon is a flag signal for determining IS [ch] depending on whether or not the target pixel C is in an outline area, and can either use the same value for all colors or separate values for the different colors. The switch CED for making this selection is provided in the register rg, and CED is set to "1" when the operator makes a setting operation so that the same value is to be used for all colors, and is set to "0" when a setting operation is made so as to use independent values for the different colors.

Figure 11:
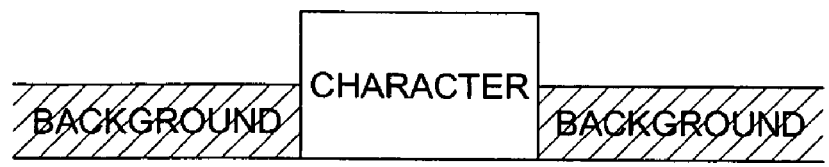
FIGS. 11(a) and 11(b) are diagrams explaining the trapping processing.
Figure 11:
Figure 11:
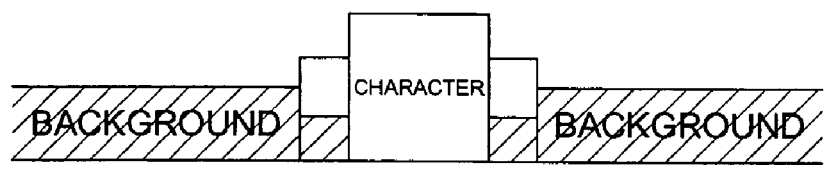
Figure 11:
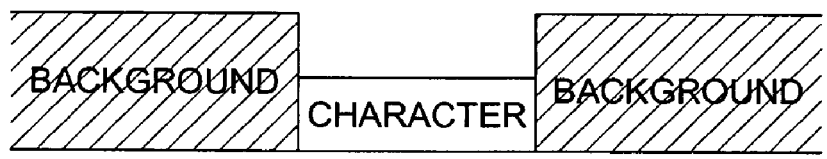
Figure 11:
Figure 11:
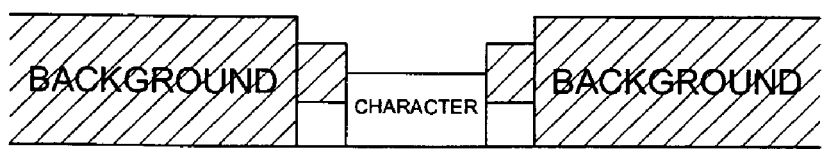

Further, ATRAP is a flag that determines whether or not trapping processing is to be made, and the value "1" indicating that trapping processing is to be made or the value "0" indicating the trapping processing is not to be made is set in this flag in accordance with the setting operation made by the operator. Trapping processing is, as is shown in FIGS. 11(*a*) and 11(*b*), the process of carrying out superimposition in units of a pixel the text characters and the background, for example, when printing text characters and background in the knock out mode, and here the background is taken to be extended and superimposed on the text characters.

As is shown in FIG. 10, the image level adjustment section 7 first refers to the value of CED stored in the register rg and judges whether the value "1" or the value "0" has been set in it (Step S41). If CED=0 (Step S41: 0), the setting Tedgecon=EDGECON [ch] is made (Step S42), and independent values are used as Tedgecon for the different colors. On the other hand, if CED=1 (Step S41: 1), the judgment is made to determine if any one among the EDGECON [ch] signals for the different colors, that is, among EDGECON [Y], EDGECON [M], EDGECON [C], and EDGECON [K], has been set to 1 (Step S43).

Next, if one of the EDGECON [ch] signals has been set to 1 (Step S43: Y), the setting Tedgecon=1 is made (Step S44), and if none of the EDGECON [ch] signals has been set to 1 (Step S43: N), the setting Tedgecon=0 is made (Step S45). In this case, a value common to all the colors will be used for Tedgecon.

When Tedgecon is obtained in this manner, the decision is made of whether or not Tedgecon is equal to 1 (Step S46). If Tedgecon is not equal to 1 (Step S46: N), that is, when Tedgecon is either equal to 0 or equal to EDGECON [ch], the setting IS [ch]=C [ch] is made and the unprocessed pixel value C [ch] is output (Step S47).

On the other hand, when Tedgecon is equal to 1 (Step S46: Y), the judgment is made of whether or not PEDGE is greater than REDGE (Step S48). If PEDGE is greater than REDGE (Step S48: Y), that is, when the target pixel C is in the corrected area an also the high edge is higher, the setting IS [ch]=IAS [ch] is made and the pixel value IAS [ch] that has been adjusted for halftone processing is output.

Here, the method of calculating the pixel value IAS [ch] whose output level has been adjusted for halftone processing in the outline area is described. IAS [ch] is calculated using the ias function shown in FIG. 12 based on the pixel value C [ch] of the target pixel C and on the value of the TAG flag.

Figure 12:
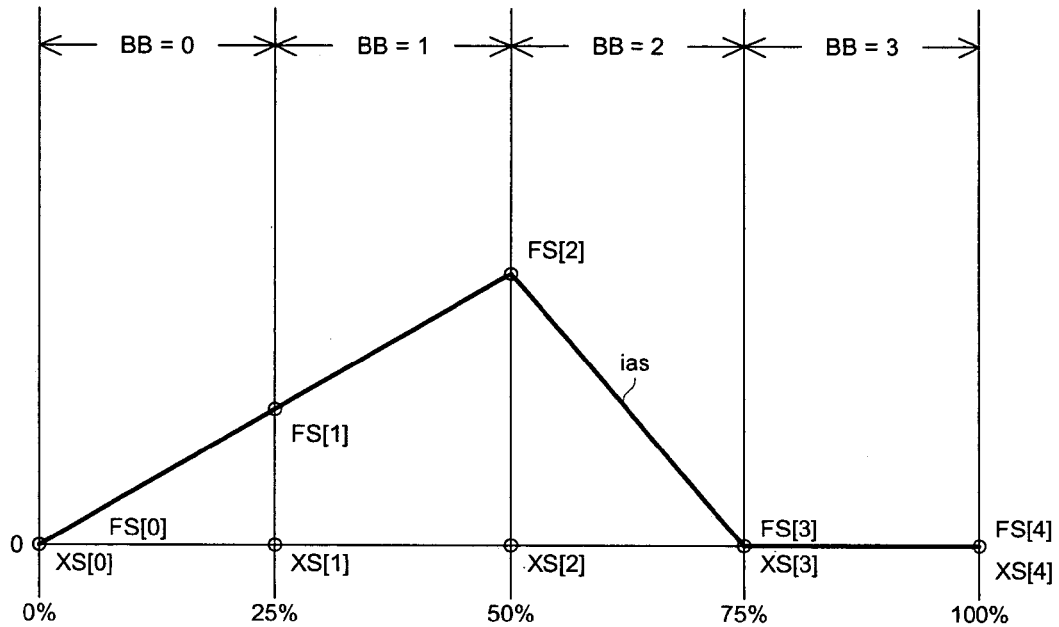
FIG. 12 is a diagram showing the "ias" function.

The ias function shown in FIG. 12 is designed so that, in the region in which the input level of the pixel value is low in the range of 0% to 50%, no output level adjustment is made and the input value is output as such as the output value. In the range of 50% to 75%, the output level starts decreasing and becomes 0 at 75%. This is because different halftone processing such as contone processing and screen processing are done later in the halftone processing section 8 and either the continuous tone processed output value or the screen processed value is selected and output in the selection output section 9, and hence the ias function has been designed so that in the corrected area the output value of the level adjusted image data IS [ch] is reduced and the continuous tone processed output value is output. In addition, the ias function has been designed so that the output becomes 0 in the range of 75% to 100%. In other words, the control is being made so that the screen processed output is selected in the later stage.

In this manner, by adjusting the output level based on the input level of the pixel value in the outline area, even when outline enhancement or suppression is made for the outline area, the gradation will not be lost in the low density area, and the outline will be smooth even when output level adjustment is made so as not to output the screen processed image in the high density area. In addition, in the medium density region, since it is possible to changeover continuously between different halftone processing types for low densities and high densities, it is possible to prevent the generation of image noise due to switching between processes.

The ias function is described below. As is shown in FIG. 12, the pixel value of the image data is indicated by the range 0 to 100%, and the range is divided into segments of 25% each which are denoted by BB so that the 0%~25% segment is denoted by BB=0, 25%~50% segment is denoted by BB=1, 50%~75% segment is denoted by BB=2, and the 75%~100% segment is denoted by BB=3, and the pixel values at the boundary points of the different segments BB, that is, the pixel values at 0%, 25%, 50%, 75%, and 100% are denoted by XS [BB]. Further, the output values FS [BB] [TAG] are set beforehand corresponding to each XS [BB] for each TAG and these are stored in the register rg. At this time, by setting FS [BB] [TAG] according to the attributes of the image, it is possible to control the degree of output level adjustment according to the attributes of the image.

The ias function is a linear interpolation function of the different output values FS [BB] [TAG], and is expressed by Equation 9 given below. It is possible to obtain the output value IAS [ch] by inputting the input level of the pixel value C [ch] of the target pixel C in the vol function expressed by Equation 9.

$$IAS[ch] = FS[BB][TAG] + \frac{(FS[BB+1][TAG] - FS[BB][TAG]) \times (C[ch] - XS[BB])}{64} \quad \text{[Eqn. 9]}$$

During the calculation, first the pixel value C [ch] of the target pixel C and XS [BB] are compared, and the segment BB (BB=0, 1, 2, 3) to which the pixel value C [ch] belongs is calculated as BB=1 if C [ch]<XS [1], as B=2 if XS [1]≦C [ch]<XS [2], as B=3 if XS [2]≦C [ch]<XS [3], as B=4 if XS [3]≦C [ch].

Next, TAG is referred to, the output value FS [BB] [TAG] corresponding to TAG and BB is obtained from the register rg, and IAS [ch] is computed by entering this output value in the above Equation 9.

Next, the operations are described from Step S48 shown in FIG. 10. In the case when PEDGE is not greater than REDGE (Step S48: N), that is, when the target pixel C has higher low edge, the value of ATRAP stored in the register rg is referred to and a judgment is made as to which of the values "0" and "1" has been set in it (Step S50). If ATRAP=0 (Step S50: 0), no trapping processing is made and the value of ICE [ch] calculated in the outline enhancement and suppression section 6 is output as IS [ch] (Step S51). That is, the output level of the background is reduced by the extent to which the text character was enhanced. On the other hand, when ATRAP is equal to 1 (Step S50: 1), the setting of IS [ch]=C [ch]+ REDGE [ch] is made (Step S52). In other words, trapping processing is made for the outline area and the background color is mixed with the outline of the text character.

As explained above, this processing ends when the adjusted image data IS [ch] whose output level has been adjusted based on the input level of the pixel values in the outline area has been generated, and the image level adjustment section 7 outputs the generated level adjusted image data IS [ch] to the halftone processing section 8.

The halftone processing section 8 is configured to comprise the γ correction section 81, the contone processing section 82, the γ correction section 83, and the screen processing section 84.

The γ correction section 81 carries out gamma correction on the outline processed image data IE [ch] output by the outline enhancement and suppression section 6 and outputs the gamma corrected data to the contone processing section 82. The contone processing section 82 carries out contone processing on the gamma corrected data IE [ch] input from the γ correction section 81 and generated the image data CONTONE. The contone processing is that of outputting the input image data IE [ch] as it is. That is, there is no change in the outline processed image data IE [ch] before and after the contone processing. The generated image data CONTONE is output to the selection output section 9. Further, in the present preferred embodiment, although contone processing of the outline processed image data was adopted, it is also possible to carry out screen processing with a higher number of lines than the screen processing done in the screen processing section 84.

The γ correction section 83 carries out gamma correction on the level adjusted image data IS [ch] and outputs the gamma corrected image data to the screen processing section 84. The screen processing section 84 carries out screen processing on the gamma corrected level adjusted image data IS [ch] input from the γ correction section 83 and generates the image data SCREEN. During screen processing, γ correction processing that corrects for the gray scale characteristics of the output device 17 such as a printer and also multiple-value dithering are carried out. The generated image data SCREEN is output to the selection output section 9.

The selection output section 9 is a 2-input 1-output selector and selects and outputs one of the image data CONTONE and SCREEN input from the halftone processing section 8 based on EDGECON [ch].

Figure 13:
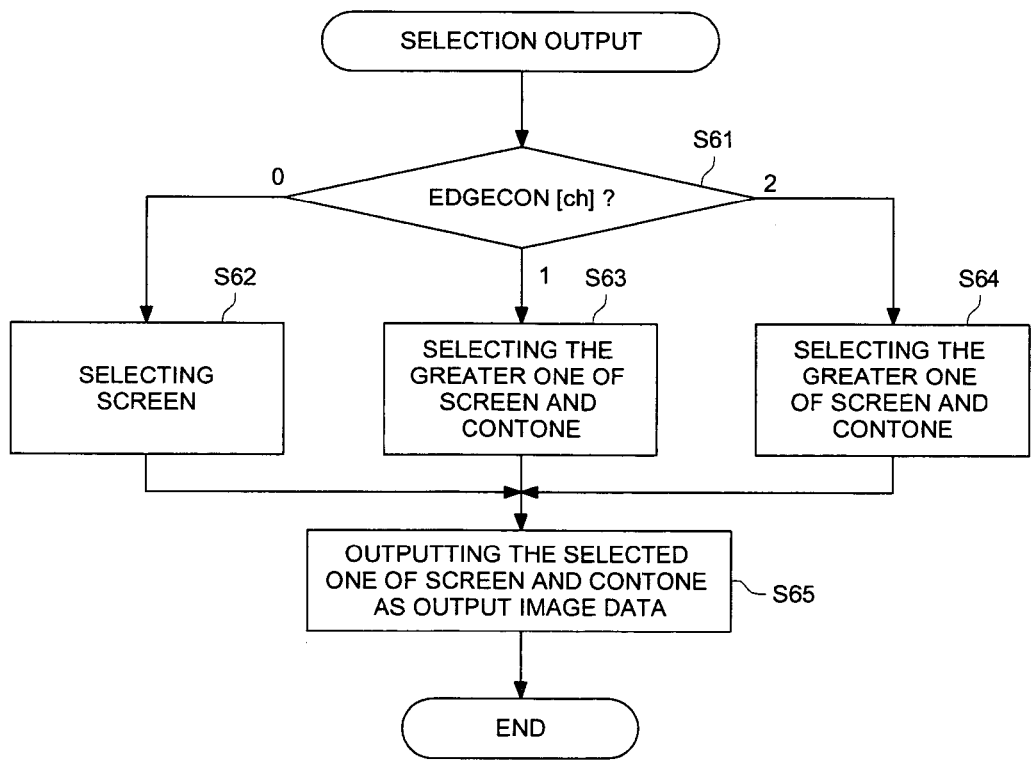
FIG. 13 is a flow chart explaining the method of selecting the output image data in the selection output section 9.

The method of output image data selection done by the selection output section 9 is explained here referring to FIG. 13.

As is shown in FIG. 13, the selection output section 9 first refers to EDGECON [ch] of the target pixel C and judges whether one of the values "0," "1," and "2" have been set in it (Step S61).

When the value 0 has been set in EDGECON [ch] (Step S61: 0), the image data SCREEN is selected as the output image data (Step S62). In other words, the screen processed image is selected because the target pixel C is not an outline area. Further, when EDGECON [ch] has been set to 1 (Step S61: 1), the image data SCREEN or CONTONE having the larger output value is selected as the output image data (Step S63). Also, when the value 2 has been set in EDGECON [ch] (Step S61: 2), the image data SCREEN or CONTONE having the larger output value is selected as the output image data (Step S64).

Figure 14:
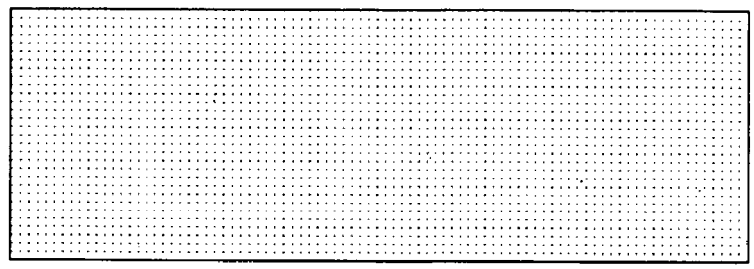
FIG. 14(a) is an example of original halftone image.
FIG. 14(b) is the output when contone selection is made for all the image data in the outline area of the original image during selective output.
FIG. 14(c) is the output when the contone or the screen image data having the higher value is selected in the outline area of the original image.
Figure 14:
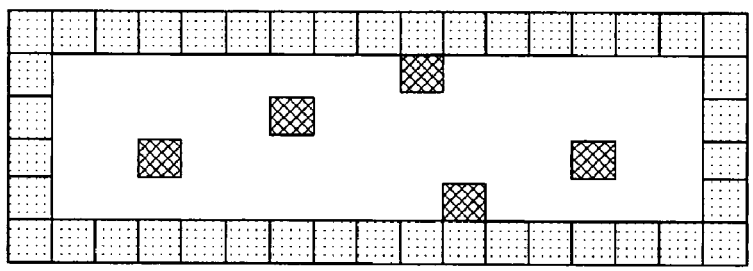
Figure 14:
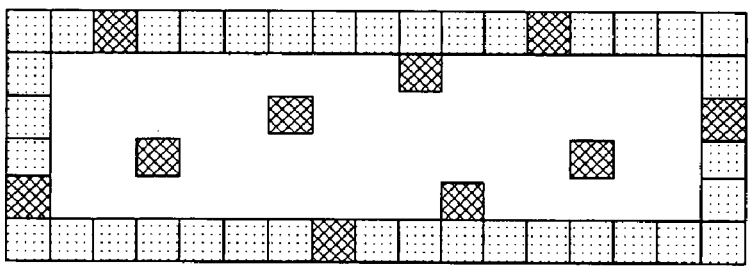
Figure 14:
Figure 14:

In this manner, the SCREEN or the CONTONE image data having the higher output value is being selected in order to avoid excessive reduction in density in the outline area. When EDGECON [ch] is 1, since the target pixel C is in the corrected area that has excluded areas with thin line structures, the imaged data CONTONE after contone processing and the image data SCREEN after screen processing would have been generated after outline enhancement and suppression processing. When EDGECON [ch] is 2, since the target pixel C is in the outline area and also has thin line structures, the image data will not be subjected to outline enhancement and suppression processing, and either only the image data CONTONE after contone processing or only the image data SCREEN after screen processing will have been generated. The printer becomes unstable when continuous tone output is made in the low density area and it is likely that the outline areas are mostly not reproduced. For example, if CONTONE output is selected uniformly for the entire area when outputting a halftone original image such as the one shown in FIG. 14(a), it is difficult to reproduce the outline area as is shown in FIG. 14(b) when the output level of the pixel values is low, and the outline becomes fuzzy in its appearance to the eye. However, since in general higher density is achieved in reproduction by screen processing, by selecting the larger output value of SCREEN and CONTONE for the outline area as is shown in FIG. 14(c), that is, by selecting the SCREEN output when it is larger, rather than selecting uniformly the CONTONE output, it is possible to avoid unnecessary density reductions in the outline area.

In this manner, when one of the image data SCREEN and CONTONE is selected, the selection output section 9 outputs that selected data as the output image data to the output device 17 (Step S65).

Figures 15A, 15B:
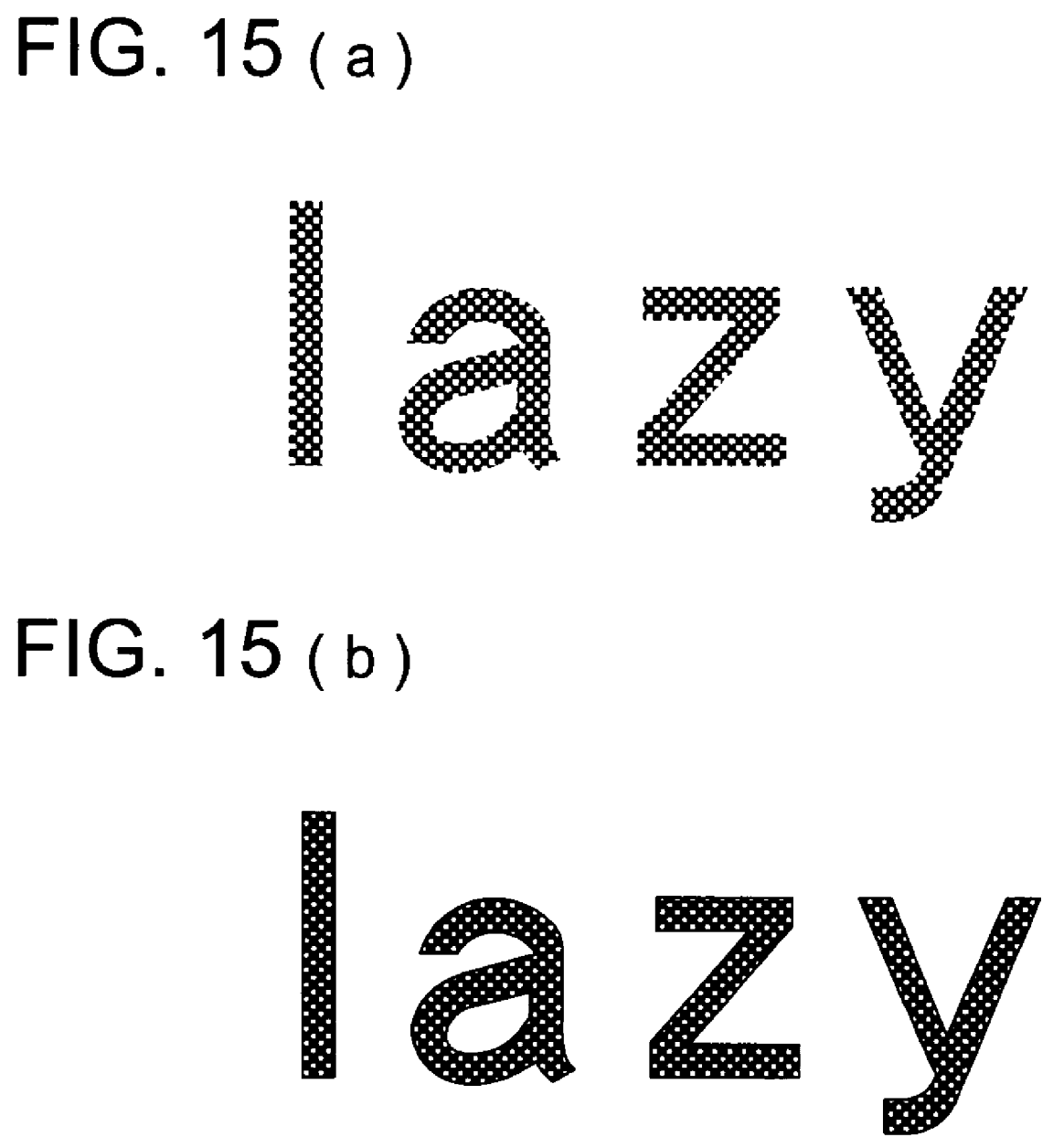

Examples of output are shown in FIG. 15. FIG. 15(a) is a diagram showing the text characters output after only screen processing, and FIG. 15(b) is a diagram showing the same text characters reproduced by applying the present invention and is a figure showing the reproduced characters in which the outline is enhanced and which are reproduced with more halftone than screen processing. By comparing the two, it is clear that the characters reproduced by applying the present invention not only have their outlines enhanced as is shown in FIG. 15(b) but also more halftones have been reproduced in the area inside the text characters enclosed in the outline than is reproduced by screen processing while also maintaining the gray scale characteristics.

As has been explained so far, according to the embodiment of the present invention, for the corrected area obtained by excluding the thin line structures from the outline area, the image data CONTONE which is obtained by carrying out contone processing after carrying out outline enhancement and suppression processing, and the image data SCREEN which is obtained by carrying out screen processing after carrying out output level adjustment for halftone processing are generated, and one of CONTONE and SCREEN having the larger output value is selected and output as the output image data. Further, no outline enhancement and suppression processing is made for the outline area containing thin line structures, and the image data CONTONE for which contone processing has been made and the image data SCREEN for which screen processing has been made after output level adjustment are generated, and one of CONTONE and SCREEN having the larger output value is selected and output as the output image data. For all other areas, neither outline enhancement and suppression processing nor output level adjustment processing are made, but the image data CONTONE for which contone processing has been made and the image data SCREEN for which screen processing has been made are generated, and SCREEN is selected and output as the output image data.

Incidentally, in the embodiment of the invention, with respect to "the other area" of the image, even in the case where SCREEN is necessarily outputted as the output image data, CONTONE image data is also generated. This is caused by the fact that, in the present embodiment, the above-mentioned image processing is realized by a hardware structure. Namely, by applying the embodiment where outputting is made after the CONTONE image data or the SCREEN image data is selected, for any of "corrected area," "outline (edge) area" and "the other area," the structure of the hardware can be simplified. However, in the embodiment where the above-mentioned image processing is realized by software, the generation of CONTONE image data is not necessary.

As a consequence, since it is possible to carry out outline enhancement and suppression processing for outline areas (corrected areas) such as the areas of text characters and line drawings, etc., and to carry out screen processing for all other areas, it is possible to enhance or suppress outline portions when reproducing text characters or line drawings, etc., to maintain the resolution, to reproduce in halftones the area inside the outlines, and to maintain gray scale characteristics. In addition, even when there is a trend of text characters or line drawings in the high density areas becoming thick due to the output characteristics of the output device 17, it is possible to carry out conversion to thin lines by suppressing the outline depending on the input level of the pixel values. Furthermore, since it is possible to exclude thin line structures from outline enhancement and suppression processing, it is possible to prevent thin line sections from being lost due to conversion to further thin lines. Also, since all these image processing operations are not dependent upon the PDL language, they can be carried out in a stable manner without being affected by the type of PDL language or changes in the language specifications.

In addition, since the parameter VOL [ch] indicating the degree of enhancement (or the degree of suppression) is determined based on the input level of the pixel values in the corrected area, it is easily possible to switch between outline enhancement and outline suppression. In a similar manner, in the image level adjustment section 7, since the output level is adjusted for carrying out halftone processing based on the input level of the pixel value in the outline area, it is possible to select and output naturally between the CONTONE output for which contone processing has been made and the SCREEN output for which screen processing has been made.

Furthermore, since it is possible to control whether or not to carry out outline enhancement and suppression for the outline area by setting the OLCL flag, and since it is possible to control whether or not to exclude areas with thin line structures from the target of outline enhancement and suppression by setting the TLCL flag, it is possible to set the freely the image processing to be carried out according to the wishes of the operator.

In addition, since it is possible to set for each TAG the output value EC [AA] that determines the VOL [ch] parameter used during output level adjustment in the outline enhancement and suppression section 6 and the output value FS [BB] that determines the IAS [ch] parameter used during output level adjustment in the image level adjustment section 7, and since it is possible to calculate VOL [ch] or IAS [ch] using the output values EC [AA] or FS [BB] according to the value of TAG that is input along with the input image data IMAGE, it is possible to set the optimum output level in accordance with the attributes of the image.

Furthermore, in the present preferred embodiment, although the example described had assumed that the image processing apparatus is incorporated within a printer, it is also possible to have a configuration in which other the image processing apparatus is incorporated in other equipment, and also the configuration can be one in which the image processing apparatus is used in a stand alone mode.

In addition, as has been described above, by setting the TLCL flag to "1," it is possible to have a configuration in which outline enhancement and suppression is carried out for the outline area containing edges without excluding thin line structures, and carrying out different halftone processing (contone processing or screen processing) for that outline area and for other areas. In a similar manner, although in the present preferred embodiment output level adjustment was carried out in the image level adjustment section 7 for the outline area in order to carry out its halftone processing later, it is possible to have a configuration in which this is eliminated using OLCL or other flags.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image processing apparatus comprising:
an extracting unit for extracting an edge area of an image;
an edge correction unit for, based on a level of a pixel value of the edge area of the image, correcting the pixel value of the edge area of the image; and
a halftone processing unit for carrying out a first halftone processing on the edge area of which the pixel value has been corrected and a second halftone processing on an area of the image that is different from the edge area, the second halftone processing being different from the first halftone processing;
wherein the second halftone processing is a first screen processing, and the first halftone processing is one of a contone process and a second screen processing that uses a screen of which a number of screen lines is different from a number of screen lines of a screen used by the first screen processing.

2. The image processing apparatus of claim 1, wherein the extracting unit extracts the edge area based on image data.

3. The image processing apparatus of claim 2, further comprising an image input unit for inputting image data.

4. The image processing apparatus of claim 3, wherein the extracting unit extracts the edge area based on the image data inputted from the image input unit.

5. The image processing apparatus of claim 1, wherein the image comprises at least one of a character image and an image including a thin line area.

6. An image processing apparatus comprising:
- an edge correction unit for, based on a level of a pixel value of an edge area of an image, correcting the pixel value of the edge area of the image;
- a halftone processing unit for carrying out a first halftone processing on the edge area of which the pixel value has been corrected and a second halftone processing on an area of the image that is different from the edge area, the second halftone processing being different from the first halftone processing; and
- a thin line area detecting unit for detecting a thin line area of the image.

7. The image processing apparatus of claim 6, wherein the edge correction units corrects a part of the edge area that is not determined as the thin line area.

8. The image processing apparatus of claim 6, wherein the thin line area detecting unit uses a mask of n columns and n rows to detect the thin line area.

9. The image processing apparatus of claim 8, wherein the thin line area detecting unit determines that the image includes a thin line area if an area that corresponds to the mask has edges on both sides of a target pixel in a first direction and has an image continuity in a second direction orthogonal to the first direction.

10. The image processing apparatus of claim 9, wherein the edge correction unit further determines that the image includes the thin line area based on a number of conjunction between the target pixel and surrounding pixels.

11. An image processing apparatus comprising:
- an edge correction unit for, based on a level of a pixel value of an edge area of an image, correcting the pixel value of the edge area of the image; and
- a halftone processing unit for carrying out a first halftone processing on the edge area of which the pixel value has been corrected and a second halftone processing on an area of the image that is different from the edge area, the second halftone processing being different from the first halftone processing;
- wherein the edge correction unit carries out one of an edge enhancement and an edge suppression on the edge area by correcting the pixel value of the edge area.

12. An image processing apparatus comprising:
- a first edge correction unit for, based on a level of a pixel value of an edge area of an image, correcting the pixel value of the edge area of the image in accordance with a first correction processing;
- a second edge correction unit for, based on the level of the pixel value of the edge area of the image, correcting the pixel value of the edge area of the image in accordance with a second correction processing;
- a halftone processing unit for carrying out a first halftone processing on the edge area of which the pixel value has been corrected by the first edge correction unit and a second halftone processing on the edge area of which the pixel value has been corrected by the second edge correction unit; and
- a select unit for selecting one of the pixel value obtained by the first halftone processing and the pixel value obtained by the second halftone processing.

13. The image processing apparatus of claim 12, wherein the first edge correction unit carries out one of an edge enhancement and an edge suppression.

14. The image processing apparatus of claim 12, wherein the first halftone processing includes a contone processing and the second halftone processing includes a screen processing.

15. The image processing apparatus of claim 14, wherein the select unit selects a higher one of the pixel value obtained by the first halftone processing and the pixel value obtained by the second halftone processing.

16. The image processing apparatus of claim 14, wherein each of the first halftone processing and the second halftone processing further includes a gamma correction processing.

17. The image processing apparatus of claim 16, wherein the halftone processing unit carries out the contone processing on the edge area to which the gamma correction processing has been applied, and carries out the screen processing on the edge area to which the gamma correction processing has been applied.

18. The image processing apparatus of claim 12, further comprising an extracting unit for extracting the edge area of the image.

19. The image processing apparatus of claim 18, further comprising an image input unit for inputting image data.

20. The image processing apparatus of claim 19, wherein the extracting unit extracts the edge area based on the image data inputted from the image input unit.

21. The image processing apparatus of claim 12, further comprising a thin line area detecting unit for detecting a thin line area of the image.

22. The image processing apparatus of claim 21, wherein the edge correction units corrects a part of the edge area that is not determined as the thin line area.

23. The image processing apparatus of claim 21, wherein the thin line area detecting unit uses a mask of n columns and n rows to detect the thin line area.

24. The image processing apparatus of claim 23, wherein the thin line area detecting unit determines that the image includes a thin line area if an area that corresponds to the mask has edges on both sides of a target pixel in a first direction and has an image continuity in a second direction orthogonal to the first direction.

25. The image processing apparatus of claim 24, wherein the edge correction unit further determines that the image includes the thin line area based on a number of conjunction between the target pixel and surrounding pixels.

26. The image processing apparatus of claim 12, wherein the edge correction unit carries out one of an edge enhancement and an edge suppression on the edge area by correcting the pixel value of the edge area.

27. The image processing apparatus of claim 12, wherein the image comprises at least one of a character image and an image including a thin line area.

28. An image processing method comprising:
- extracting an edge area of an image based on image data;
- correcting, based on a level of a pixel value of the edge area of the image, the pixel value of the edge area of the image; and
- carrying out a first halftone processing on the edge area of which the pixel value has been corrected and a second halftone processing on an area of the image that is different from the edge area, the second halftone processing being different from the first halftone processing;
- wherein the second halftone processing is a first screen processing and the first halftone processing is one of a contone process and a second screen processing that uses a screen of which a number of screen lines is different from a number of screen lines of a screen used by the first screen processing.

29. The image processing method of claim 28, wherein the image comprises at least one of a character image and an image including a thin line area.

30. An image processing method comprising:
correcting, based on a level of a pixel value of the edge area of the image, the pixel value of the edge area of the image; and
carrying out a first halftone processing on the edge area of which the pixel value has been corrected and a second halftone processing on an area of the image that is different from the edge area, the second halftone processing being different from the first halftone processing; and
detecting a thin line area of the image,
wherein in the correcting step, the correction is carried out on a part of the edge area that is not determined as the thin line area.

31. The image processing method of claim 30, wherein, in the detecting step, a mask of n columns and n rows is used to detect the thin line area.

32. The image processing method of claim 31, wherein, in the detecting step, the image is determined to include a thin line area if an area that corresponds to the mask has edges on both sides of a target pixel in a first direction and has an image continuity in a second direction orthogonal to the first direction.

33. The image processing method of claim 32, wherein, in the detecting step, the image is further determined to include the thin line area based on a number of conjunction between the target pixel and surrounding pixels.

34. An image processing method comprising:
correcting, based on a level of a pixel value of the edge area of the image, the pixel value of the edge area of the image; and
carrying out a first halftone processing on the edge area of which the pixel value has been corrected and a second halftone processing on an area of the image that is different from the edge area, the second halftone processing being different from the first halftone processing;
wherein one of an edge enhancement and an edge suppression is carried out on the edge area by correcting the pixel value of the edge area.

35. An image processing method comprising:
correcting, based on a level of a pixel value of an edge area of an image, the pixel value of the edge area of the image in accordance with a first correction processing, and correcting, based on the level of the pixel value of the edge area of the image, the pixel value of the edge area of the image in accordance with a second correction processing;
carrying out a first halftone processing on the edge area of which the pixel value has been corrected by the first correction processing, and a second halftone processing on the edge area of which the pixel value has been corrected by the second correction processing; and
selecting one of the pixel value obtained by the first halftone processing and the pixel value obtained by the second halftone processing.

36. The image processing method of claim 35, wherein, in the correcting step, one of an edge enhancement and an edge suppression is carried out.

37. The image processing method of claim 35, wherein the first halftone processing includes a contone processing and the second halftone processing includes a screen processing.

38. The image processing method of claim 37, wherein in the selecting step, a higher one of the pixel value obtained by the first halftone processing and the pixel value obtained by the second halftone processing is selected.

39. The image processing method of claim 37, wherein, each of the first halftone processing and the second halftone processing further includes a gamma correction processing, and wherein, in the carrying out step, the contone processing is carried out on the edge area to which the gamma correction processing has been applied, and the screen processing is carried out on the edge area to which the gamma correction processing has been applied.

40. The image processing method of claim 35, further comprising extracting the edge area of the image based on image data.

41. The image processing method of claim 35, further comprising detecting a thin line area of the image, wherein, in the correcting step, the correction is carried out on a part of the edge area that is not determined as the thin line area.

42. The image processing method of claim 41, wherein, in the detecting step, a mask of n columns and n rows is used to detect the thin line area.

43. The image processing method of claim 42, wherein, in the detecting step, the image is determined to include a thin line area if an area that corresponds to the mask has edges on both sides of a target pixel in a first direction and has an image continuity in a second direction orthogonal to the first direction.

44. The image processing method of claim 43, wherein, in the detecting step, the image is further determined to include the thin line area based on a number of conjunction between the target pixel and surrounding pixels.

45. The image processing method of claim 35, wherein, in the correcting step, one of an edge enhancement and an edge suppression is carried out on the edge area by correcting the pixel value of the edge area.

46. The image processing method of claim 35, wherein the second halftone processing is a first screen processing and the first halftone processing is one of a contone processing and a second screen processing that uses a screen of which a number of screen lines is different from a number of screen lines of a screen used by the first screen processing.

47. The image processing method of claim 35, wherein the image comprises at least one of a character image and an image including a thin line area.

* * * * *